(12) United States Patent
Mazza et al.

(10) Patent No.: US 7,943,190 B2
(45) Date of Patent: May 17, 2011

(54) EXTRACTION OF PHYTOCHEMICALS

(75) Inventors: Giuseppe Mazza, Penticton (CA); Juan Eduardo Cacace, Penticton (CA)

(73) Assignee: Her Majesty the Queen in Right in Canada as Represented by the Minister of Agriculture and Agri-Food Canada, Summerland, British Columbia (CA)

( * ) Notice: Subject to any disclaimer, the term of this patent is extended or adjusted under 35 U.S.C. 154(b) by 1082 days.

(21) Appl. No.: 11/128,259

(22) Filed: May 13, 2005

(65) Prior Publication Data
US 2007/0014912 A1 Jan. 18, 2007

(51) Int. Cl.
*A23L 1/212* (2006.01)
(52) U.S. Cl. ........ 426/425; 426/431; 426/434; 426/472; 426/478; 426/481; 426/506; 424/725
(58) Field of Classification Search ............... 426/74, 426/620, 615, 640, 639, 658, 425, 431, 434, 426/472, 478, 481, 506; 424/725
See application file for complete search history.

(56) References Cited

U.S. PATENT DOCUMENTS

| | | | | |
|---|---|---|---|---|
| 4,298,626 A | 11/1981 | Laws et al. | | 426/600 |
| 4,490,398 A | 12/1984 | Behr et al. | | 426/312 |
| 4,727,889 A | 3/1988 | Niven, Jr. et al. | | 131/297 |
| 4,898,188 A | 2/1990 | Niven, Jr. et al. | | 131/296 |
| 5,264,236 A | 11/1993 | Ogasahara et al. | | 426/600 |
| 5,705,618 A | 1/1998 | Westcott et al. | | 530/500 |
| 5,925,401 A | 7/1999 | Kankaanpaa-Anttila et al. | | 426/656 |
| 6,001,256 A | 12/1999 | Hawthorne et al. | | 210/643 |
| 6,123,945 A | 9/2000 | Nakatsu et al. | | 424/745 |
| 6,264,853 B1 | 7/2001 | Westcott et al. | | 252/1 |
| 6,352,644 B1 | 3/2002 | Hawthorne et al. | | 210/643 |
| 6,458,407 B1 | 10/2002 | Miki et al. | | 426/651 |
| 7,208,181 B1 * | 4/2007 | King et al. | | 424/725 |
| 2005/0095332 A1 * | 5/2005 | Stanley | | 426/481 |

FOREIGN PATENT DOCUMENTS
WO 2004/027074 4/2004

OTHER PUBLICATIONS

King, J. W., "Subcritical Water Extraction of Anthocyanins from Fruit Berry Substrates", Los Alamos National Laboratory, Los Alamos, NM, Apr., 2006, pp. 1-10.*
Eliasson et al., "High-performance liquid chromatographic analysis of secoisolariciresinol diglucoside and hydroxycinnamic acid glucosides in flaxseed by alkaline extraction", (2003), *J. Chromatography*, 1012: 151-159.

(Continued)

*Primary Examiner* — Helen F Heggestad
(74) *Attorney, Agent, or Firm* — Gowling Lafleur Henderson LLP

(57) ABSTRACT

A processing system and methods for extracting phytochemicals from plant materials with subcritical water. The processing system includes a water supply interconnected with a high-pressure pump, diverter valve, a temperature-controllable extraction vessel, a cooler, a pressure-relief valve and a collection apparatus for collecting eluant fractions from the extraction vessel. The processing system controllably varies the temperature of subcritical water within the extraction vessel, and may optionally be configured to controllably vary the pH of subcritical water flowing into the extraction vessel. A plant material is placed into the extraction vessel after which a flow of subcritical water is provided through the extraction vessel for extraction of phytochemicals. The temperature of subcritical water is controllably varied during its flow through the extraction vessel water thereby producing a plurality of eluant subfractions corresponding to the temperature changes, thereby separating the different classes of phytochemicals extracted from the plant material.

8 Claims, 28 Drawing Sheets

OTHER PUBLICATIONS

Bradford, "A Rapid and Sensitive Method for the Quantitation of Microgram Quantities of Protein Utilizing the Principle of Protein-Dye Binding", (1976), *Anal. Biochem.* 72: 248-254.

Sweeney, "Generic Combustion Method for Determination of Crude Protein in Feeds: Collaborative Study", (1989), *JAOAC*, 72: 770-774.

Choi et al., "Pressurized liquid extraction of active ingredients (ginsenosides) from medicinal plants using non-ionic surfactant solutions", (2003), *J. Chromatog. A. 983*, 153-162.

Dubois et al., "Colorimetric Method for Determination of Sugars and Related Substances", (1956), *Anal. Chem.*, 28: 350-356.

Fox et al., "Miniaturization of Three Carbohydrate Analyses Using a Microsample Plate Reader", (1990), *Anal. Biochem.*, 195: 93-96.

Oleszek, "Solid-Phase Extraction-Fractionation of Alfalfa Saponins", (1988), J. Sci. Food Agric., 44: 43-49.

Mazza et al., "Compositional and Morphological Characteristics of Cow Cockle (*Saponaria vaccaria*) Seed, a Potential Alternative Crop", (1992), *J. Agric. Food Chem.*, 40: 1520-1523.

* cited by examiner (a) no inert packing materials (b) 3 g inert packing materials (a) no inert packing materials (b) 3 g inert packing materials

EXTRACTION OF PHYTOCHEMICALS

This application has two Requests for Continuation, dated Oct. 21, 2009 and Dec. 20, 2010.

FIELD OF THE INVENTION

The present invention relates to the field of extraction of phytochemicals from plants, and more particularly, to the use and manipulation of pressurized low-polarity water under subcritical conditions for extraction and separation of multiple classes of phytochemicals from plant materials during one extraction operation.

BACKGROUND OF THE INVENTION

Plants synthesize many classes of organic chemical compounds ranging from simple structures to complex molecules as part of their normal metabolic processes. These compounds are broadly characterised as: (a) primary metabolites which encompass those substances such as nucleic acids, proteins, lipids and polysaccharides that are the fundamental biologically active chemical units of living plant cells, and (b) secondary metabolites which typically have larger, more complex chemical architectures that incorporate one or more primary metabolites into their structures. Various types of secondary metabolites synthesized by plants are commonly referred to as phytochemicals, and include flavonoids, carotenoids, lignans, polyphenols, terpenes, tannins, sterols, alkaloids, saponins, waxes, fats, sugars and gums. It is known that many phytochemicals can significantly affect human metabolism and health, and therefore, there is considerable interest in extraction of these compounds for their incorporation into food products (e.g., functional foods, flavours), nutritional supplements (e.g., nutriceuticals), and in pharmacological preparations. Also, certain classes of phytochemicals are useful for the production of fragrances and for incorporation into topical preparations.

Phytochemicals typically are not soluble in water under ambient conditions due to their organic nature and the preponderance of non-ionic bonds in their architectures. However, they are readily soluble in various organic solvents such as aliphatic alcohols, hexanes, dioxanes, acids, ethers, methylene chloride, trichloroethylene, acetonitrile and the like. Numerous methods are known for extracting phytochemicals from plant materials, most based on sequential extraction processes incorporating one or more organic solvents in combination with washing steps. Some methods teach the use of alkali or alkaline solvents in combination with said organic solvents for increased extraction efficiency. Starting plant materials are usually physically disrupted by means of grinding, shredding, chopping, pulverizing, compressing, or macerating in order to improve extraction efficiencies. Phytochemical extracts produced by such methods must be further processed to remove all trace of the organic solvents, to remove impurities, and to separate and purify individual phytochemicals. Examples of such methods are disclosed in U.S. Pat. No. 5,705,618 issued on Jan. 6, 1998, U.S. Pat. No. 5,925,401 issued on Jul. 20, 1999, U.S. Pat. No. 6,264,853 issued on Jul. 24, 2001, and WIPO International Publication No. 2004/027074 published on Apr. 1, 2004. While such methods are useful for extraction and purification of small quantities of phytochemicals for research purposes, they are difficult to scale to commercial through-put volumes because of the problems associated with cost-effectively, safety and completely removing and recovering the organic solvents from the extracts and spent plant materials. Furthermore, the types and concentrations of organic solvents must be carefully selected in order to avoid structural changes to the target phytochemicals during extraction that may adversely affect one or more of their desirable physical, chemical and biological properties.

It is known that the physical and chemical properties of water within sealed systems can be manipulated by concurrently controlling the temperature and pressure, whereby the water remains in a liquid state even though its temperature is significantly increased above its atmospheric boiling point of 100° C. In this condition, it is known as "subcritical" or "hot/liquid" water. Subcritical water can be maintained in the liquid form until a temperature of 374° C. and a pressure of 221 bars are reached after which, it becomes supercritical water. The polarity, viscosity, surface tension, and disassociation constant of subcritical water are significantly lowered compared to water at ambient temperature and pressure conditions, thereby significantly altering its chemical properties to approximate those of organic solvents. Consequently, pressurized low-polarity water under subcritical conditions can easily solubilize organic compounds such as phytochemicals which are normally insoluble in ambient water. For example, U.S. Pat. No. 6,001,256 issued on Dec. 14, 1999 and U.S. Pat. No. 6,352,644 issued on Mar. 5, 2002 each describe equipment and methods for extracting volatile aromatic phytochemicals from plants for use as flavours or fragrances wherein subcritical water is produced and maintained at a selected temperature at or above its ambient boiling point of 100° C. However, these methods provide subcritical water at only one temperature during an extraction process thereby enabling extraction of only one class of organic compound from the multiplicity of classes that may be present in the source material.

SUMMARY OF THE INVENTION

It is an object of the present invention, at least in preferred forms, to provide methods and processing systems for the extraction of phytochemicals from plant materials with subcritical water.

According to one aspect of the present invention, there is provided a method for extracting phytochemicals from plant materials with subcritical water, comprising placing a plant material into a temperature-controllable extraction vessel having an inlet and an outlet, providing a flow of a volume of subcritical water through the extraction vessel thereby producing an eluant from the plant material, controllably applying a sequence of temperature increases to the flow of subcritical water flowing through the extraction vessel, and sequentially collecting a plurality of eluant fractions flowing therefrom the outlet.

According to another aspect of the present invention, there is provided a method for extracting phytochemicals from plant materials with subcritical water, comprising placing a plant material into a temperature-controllable extraction vessel having an inlet and an outlet, providing a flow of a volume of subcritical water through the extraction vessel thereby producing an eluant from the plant material, controllably applying a sequence of temperature increases to the flow of subcritical water flowing through the extraction vessel thereby producing a plurality of sub-volumes of subcritical water flowing through the extraction vessel, each sub-volume corresponding to a temperature or to a temperature change from the sequence, and then sequentially collecting a plurality of eluant fractions flowing therefrom the outlet of the extraction vessel, each eluant fraction corresponding to a sub-volume of subcritical water.

In a preferred form, the invention provides a method wherein subcritical water is produced by pressurizing a flow of heated water with a high-pressure pump until it reaches the subcritical phase wherein one or more physical properties of water become more nonpolar whereafter it is referred to as subcritical water, then passing the subcritical water through a temperature-controllable extraction vessel containing a plant material wherein the subcritical water extracts non-polar phytochemicals from the plant material. A sequence of increasing temperatures is applied to the extraction vessel during the extraction process whereby each incremental increase in temperature progressively changes the physical properties such as polarity, viscosity, surface tension, and disassociation constant of the sub-volume of subcritical water flowing through the extraction chamber at that time, thereby enabling extraction of different classes of phytochemicals in the different sub-volumes of subcritical water. The eluant fractions emanating from the extraction vessel pass through a cooler and are collected separately for storage, for further processing, or for immediate use.

In another preferred form, the invention provides a source of water wherein the pH has been modified, i.e. made more acidic or alternatively more basic, before it is pressurized and heated to make it subcritical.

In another preferred form, the invention provides a source of water wherein the pH is adjusted during the extraction process thereby providing subcritical water with a pH gradient. The pH gradient may be provided during isothermal temperature conditions applied to the extraction vessel, or alternatively, concurrently with a temperature gradient.

According to another aspect of the present invention, there is provided a processing system for extracting phytochemicals from plant materials with subcritical water, the processing system comprising a water supply, a high-pressure pump, a diverter valve, a temperature-controllable extraction vessel for receiving and retaining a plant material therein, the extraction vessel equipped with an inlet and an outlet, a temperature control device communicating with the extraction vessel for controllably increasing the temperature therein the extraction vessel, a cooler, a pressure regulator valve, a liquid collection apparatus, wherein the water supply, pump, diverter valve, temperature-controllable extraction vessel, cooler, pressure regulator valve and liquid collection apparatus are interconnected and communicate one with another to produce and manipulate the physical properties of subcritical water therein.

In a preferred form, the invention provides a processing system having a water heater interconnected between the pump and the extraction vessel for pre-heating the subcritical water before it flows into the extraction vessel.

In another preferred form, the invention provides a processing system wherein the temperature of the subcritical water flowing through the extraction vessel is controlled by mounting the extraction vessel within a temperature-controllable oven.

In another preferred form, the invention provides a processing system wherein the extraction vessel is provided with a jacket wherein the water temperature is controllable, thereby controlling the temperature of subcritical water flowing through the extraction vessel. The jacket may be integral to the extraction vessel, or alternatively, be mountable onto the exterior surface of the extraction vessel.

In another preferred form, the invention provides a processing system having equipment for providing a water supply with a pH gradient during the course of phytochemical extraction.

In another preferred form, the invention provides a processing system wherein the liquid collection apparatus is configured to controllably collect a plurality of eluant fractions flowing thereto from the extraction vessel. The liquid collection apparatus is provided with a plurality of receptacles for receiving therein each receptacle an eluant fraction.

BRIEF DESCRIPTION OF THE DRAWINGS

The present invention will be described in conjunction with reference to the following drawing in which.

DETAILED DESCRIPTION OF THE INVENTION

Embodiments of the present invention provide equipment, systems and methods for producing, maintaining and manipulating subcritical water through ranges of temperatures and pressures for extraction and purification of multiple classes of phytochemicals from plant materials during a single extraction operation. The present invention enables the controlled production and use of subcritical water for sequential solubilization and extraction of phytochemicals at temperatures significantly lower than the ambient boiling point of water i.e., in a range from about 55° C. to 100° C., as well as at temperatures greater than the ambient boiling point i.e. in the range of 100° C. to 374° C., by maintaining the extraction vessel and water inlet and outlet lines at a constant temperature within a chamber while controllably manipulating in-line pressure and rates of water flow through the system. Ambient water is heated to a temperature from the range of 50° C. to 99° C. and then is pressurized until its physical properties such as polarity, viscosity, surface tension, and disassociation constant begin changing to increasingly approximate the physical properties of non-polar solvents at which stage, the hot/liquid water thus produced is referred to as subcritical water. The term subcritical water as referred to herein means pressurized hot/liquid water maintained in a temperature range of 50° C. to 374° C. and at a pressure less than 221 bars. In addition, the present invention provides equipment and methods for controllable adjustments of subcritical water temperatures in the extraction vessels during the course of an extraction operation thereby controllably altering the polarity, viscosity, surface tension, and disassociation constant of subcriticial water during the course of a single extraction procedure, thereby enabling the sequential extraction and purification of multiple classes of phytochemicals from source plant materials.

Figure 1:
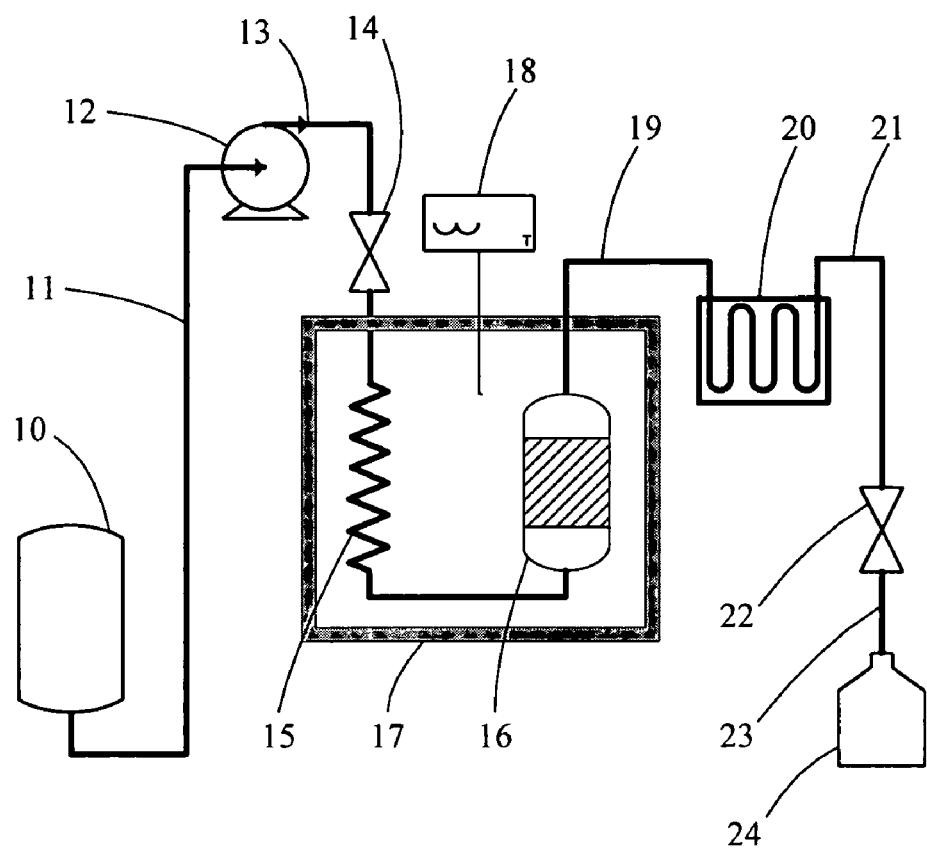
FIG. 1 is a schematic view of one embodiment of the present invention.

A preferred embodiment of the present invention is shown in FIG. 1 of the accompanying drawings illustrating a phytochemical extraction system consisting of a storage tank 10 for pure water connected by pressure-resistant piping 11 to a high-pressure pump 12 which is connected by pressure-resistant piping 13 to a diverter valve 14 which is connected to a heating coil 15 housed within temperature-controlled chamber 17. Heating coil 15 is connected to extraction vessel 16 which is mounted in temperature-controllable chamber 17. The inlet (not shown) at the bottom of extraction vessel 16 is fitted with a flit. Temperature-controllable chamber 17 is equipped with programmable temperature control and recording instrument 18. The outlet (not shown) of extraction chamber 16 is fitted with a frit, and is connected by pressure-resistant piping 19 to a cooling bath 20, which in turn is connected by pressure-resistant piping 21 to the inlet of pressure regulator valve 22. The outlet of pressure regulator valve 22 is connected by piping 23 to collection vessel 24. While only one collection vessel 24 is shown in FIG. 1, it is within the scope of this invention to provide a plurality of collection vessels for individually receiving an eluant fraction emanating from extraction vessel 16, thereby separating and individually collecting multiple eluant fractions. It is also within the scope of the present invention to provide a means for controllably withdrawing and separating multiple eluant fractions from a single collection vessel. A source plant material is loaded into extraction vessel 16. With pressure regulator valve 22 in a closed position, water is pumped from storage tank 10 by high-pressure pump 12 into extraction vessel 16 until a desired in-line pressure is achieved, usually in the range of about 10 to 100 bars. The pressurized water within the extraction vessel is then heated by controllably raising the temperature within chamber 17 while in-line pressure is maintained at a desired level by controllably opening pressure regulator valve 22 until the water becomes subcritical as measured by its decreasing polarity. Precise flow rates of subcritical water through extraction vessel 16 are achieved by regulating pressure regulator valve 22 thereby sequentially extracting and separating multiple classes of phytochemicals from the source plant material loaded into extraction vessel 16. The temperature within chamber 17 is controllably adjustable by instrument 18 during an extraction procedure.

Figure 2:
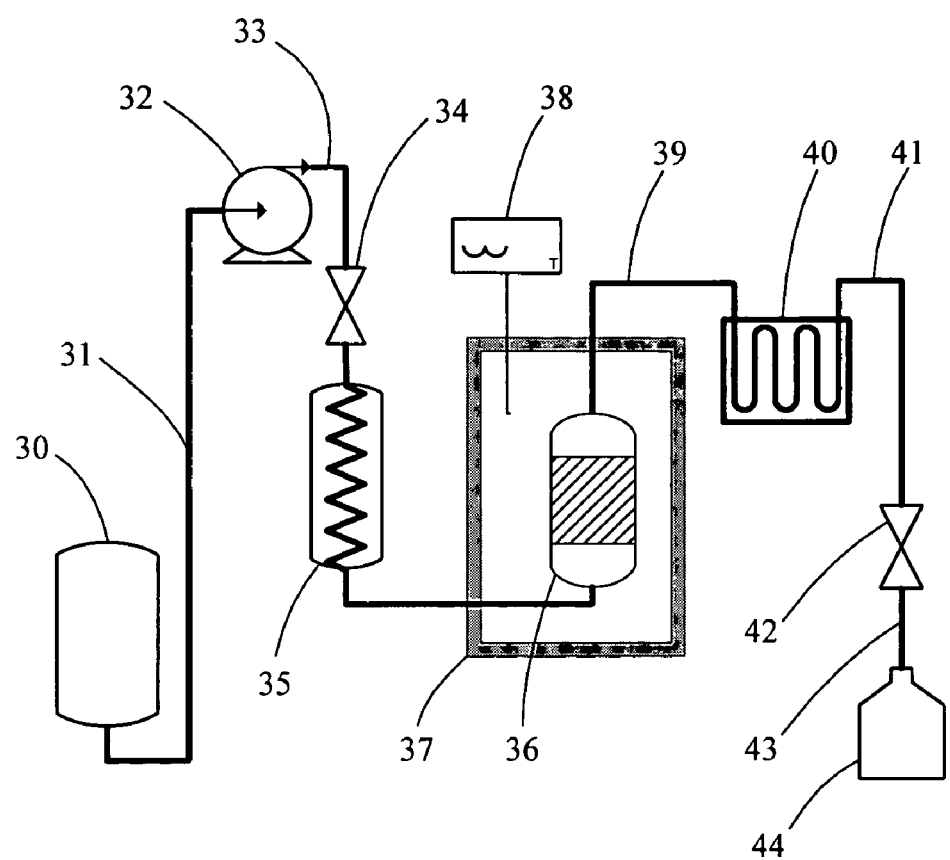
FIG. 2 is a schematic view of another embodiment of the present invention.

Another preferred embodiment of the present invention is shown in FIG. 2 illustrating a phytochemical extraction system consisting of a storage tank 30 for pure water connected by piping 31 to high-pressure pump 32 which is connected by pressure-resistant piping 33 to a diverter valve 34 which is connected to hot-water heater 35. Hot-water heater 35 is connected to extraction vessel 36 mounted within temperature-controllable chamber 37. The inlet (not shown) at the bottom and the outlet (not shown) mounted at the top of extraction vessel 36 are both fitted with frits. Temperature-controllable chamber 37 is equipped with programmable temperature control and recording instrument 38. The outlet of extraction chamber 36 is connected by pressure-resistant piping 39 to a cooler 40, which in turn is connected by pressure-resistant piping 41 to the inlet of pressure regulator valve 42. The outlet of pressure regulator valve 42 is connected by pressure-resistant piping 43 to collection vessel 44. A source plant material is loaded into extraction vessel 36. Water from storage tank 30 is heated to a selected temperature in water heater 35 after which, with pressure regulator valve 42 set at a desired pressure, pre-heated water is pumped from water heater 35 by high-pressure pump 32 into extraction vessel 36 until a desired in-line pressure is achieved, usually in the range of about 10 to 100 bars. The pressurized water within the extraction vessel 36 is then heated by controllably raising the temperature within chamber 37 while in-line pressure is maintained at a desired level by controllably opening pressure regulator valve 42 and diverter valve 34 until the water becomes subcritical as measured by its decreasing polarity. Precise volumes and flow rates of subcritical water through extraction vessel 36 are achieved by setting the water flow on high-pressure pump 32 thereby sequentially extracting and separating multiple classes of phytochemicals from the source plant material loaded into extraction vessel 36. While only one collection vessel 44 is shown in FIG. 2, it is within the scope of this invention to provide a plurality of collection vessels for individually receiving an eluant fraction emanating from extraction vessel 36, thereby separating and individually collecting multiple eluant fractions. It is also within the scope of the present inventions to provide means for controllably withdrawing and separating multiple eluant fractions from a single collection vessel.

Figure 3:
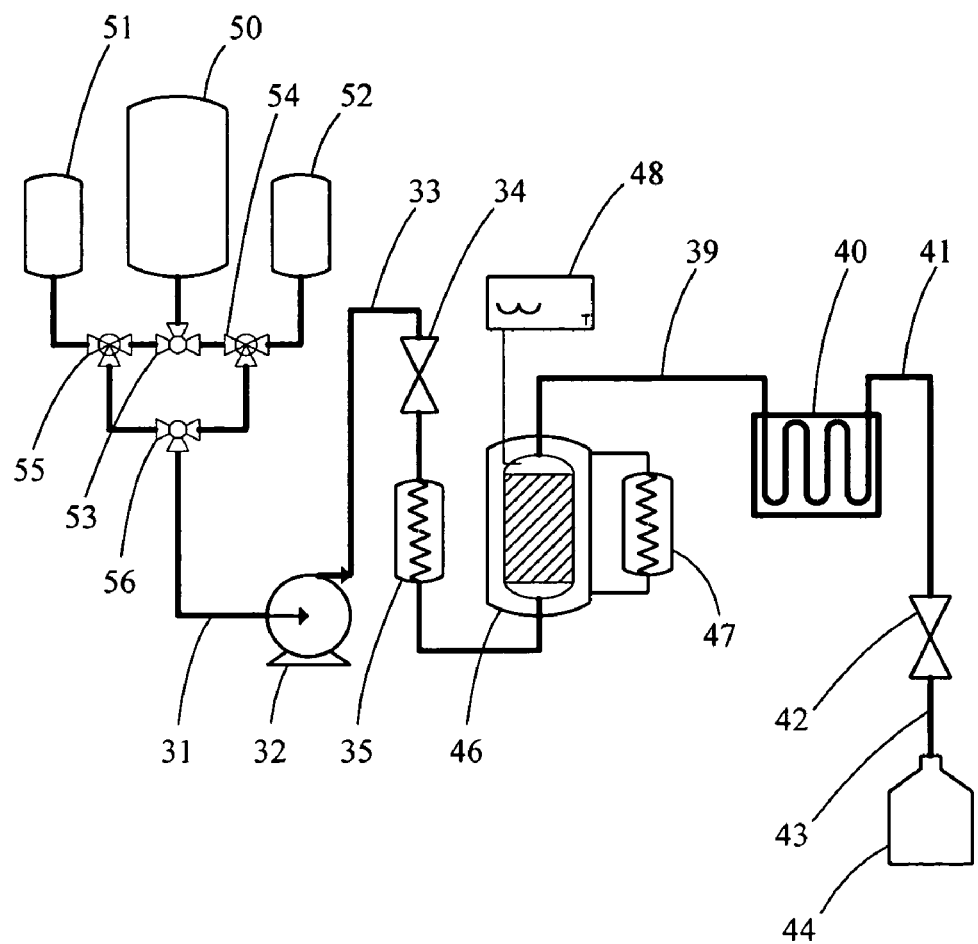
FIG. 3 is a schematic view of another embodiment of the present invention.

Another preferred embodiment of the present invention is shown in FIG. 3 illustrating the phytochemical extraction system of FIG. 2 wherein the extraction chamber 36 and temperature-controllable chamber 37 are replaced by water-jacketed extraction chamber 46 connected to water heater 47 controlled by programmable temperature control and recording instrument 48, thereby enabling more rapid rates of controllable temperature change during the course of carrying out a phytochemical extraction procedure according to the present invention. If so desired, cooler 40 may be connected to a heat exchange unit (not shown) which may be interconnected with water heaters 35 and/or 47 whereby the energy derived from cooling the eluant fractions passing through cooler is used to preheat water flowing into extraction chambers 36 or 46, or alternatively, to heat water-jacketed extraction vessel 46.

Yet another preferred embodiment of the present invention is also shown in FIG. 3 illustrating the phytochemical extraction system of FIG. 2 wherein storage tank 30 is replaced by equipment for controllably providing a pH gradient in the water supply coming into pump 32 through piping 31 as shown by way of non-limiting example, by water storage tank 50, tank 51 for storing a selected acid, and tank 52 for storing a selected base. If acidified water is desired, then water from storage tank 50 will be diverted by 3-way valve 53 to controllable mixing valve 55 which is connected to tank 51 containing the acid, thereby enabling production of water with precisely controlled acidic pHs. If water with basic pH is desired, then water from storage tank 50 would be diverted by 3-way valve 53 to controllable mixing valve 54 which is connected to tank 52 containing the base, thereby enabling production of water with precisely controlled basic pHs.

The present invention can be practised with a wide variety of source plant materials including by way of example homogenous samples, or alternatively, mixtures of whole plant parts such as seeds, flowers, leaves, stems and roots, and also, with source plant materials disrupted and processed by methods including one or more of grinding, shredding, chopping, pulverizing, compressing and macerating. This invention may be practiced with fresh hydrated plant materials or alternatively, plant materials may be dehydrated prior to extraction or alternatively, processing by one or more of the methods described above prior to extraction. The source plant materials may be packed into an extraction vessel in combination with inert physical substrates such as, by way of example, glass wool, glass beads, resin beads, silica sand, stainless steel wire cloth, and other like substrates whereby the inert substrates maintain spacing and distribution of the source plant materials throughout the vessel during the course of the extraction procedure thereby facilitating mass transfer while preventing migration and packing of the plant material against the outlet frits whereby channelling and/or clogging of subcritical water flow-through may occur. Alternatively, the inert physical substrates may be omitted if so desired.

It is preferable to use pure water for production of subcritical water. Such water may be further processed by distillation or filtration, and optionally, could be purged with nitrogen to remove all dissolved oxygen prior to its use. Such purified water typically has a pH in the range of 5.9 to 6.2. However if so desired, the pH of such purified water can be adjusted into a range of 3.5 to 9.5 with acids or bases prior to its use in the present invention, to enable solubilization and extraction of various classes of phytochemicals.

Detectors for analytical instruments may be incorporated onto or into piping on the outlet side of the extraction vessels, e.g., with piping 19, 21 or 23 in systems exemplified in FIG. 1, and piping 39, 41, and 43 as exemplified in FIGS. 2 and 3, to enable sequential detection of individual phytochemicals as they appear in the eluants emanating from the extraction vessels, thereby enabling diversion of each extracted phytochemical into a separate collection vessel. The separated extracts may then be further purified and processed if so desired or alternatively, dried.

The equipment, systems and methods of the present invention for producing, maintaining and manipulating subcritical water for extraction of phytochemicals from plant materials are described in more detail in the following examples.

EXAMPLE 1

Flaxseed contains relatively high concentrations of phenolic compounds known as lignans that have demonstrated significant potential to reduce or prevent the incidence of various forms of cancer. The principle lignans in flax are secoisolariciresinol diglycoside (SDG) and SDG attached by an ester linkage to hydroxymethylglutaric acid (SDG-HMGA ester). Flaxseed also contains significant amounts of the phenolics coumeric acid, ferulic acid, chlorogenic acid and gallic acids, as well as flavonoids. These phytochemicals are typically extracted from flaxseed or flaxseed meal with aliphatic alcohols such as ethanol and methanol, after which the extract must be de-solventized before further processing or use.

Lignans and other phenolic compounds were extracted from whole flaxseed with subcritical water using equipment and methods as described herein. Equipment included the following components: (a) a glass reservoir containing pure water, an HPLC pump (510 model, Waters, Milford, Mass. USA), (b) a 3.0-m preheating coil, (c) an extraction cell, (d) a temperature-controlled oven (5700A Series, Hewlett-Packard, Palo Alto, Calif., USA), (e) a 1.0-m cooling coil, (f) a back-pressure regulator with a 750-psi cartridge (Upchurch Scientific, Oak Harbor, Wash., USA), and (g) a collection vessel configured as illustrated in FIG. 1. The components were interconnected with stainless steel tubing with a 1.6-mm outer diameter (o.d.) using fittings adequate to withstand high pressures. Components (b) and (c), i.e., the preheating coil and extraction cell, were mounted inside component (d). Three extraction vessels were tested in this example. The first was 10-cm long with 6.8-mm o.d., the second was 10-cm long with 9.1-mm o.d., while the third was 10-cm long with 19.1-mm o.d. Each extraction vessel was tested and assessed in separate runs wherein whole flaxseed (Linum usitatissimum cv. NorMan) was placed into the vessel after which, the depth of the packed seeds was measured and then the ends of the vessel were packed with glass wool, then overlaid a 100-mesh (140-μm opening) wire cloth, and then the stainless steel tubing was connected with chromatography-column end fittings (Chromatographic Specialties Inc, Brockville, ON, Canada) and were used to connect the cell to the heating coil at the inlet end and to the cooling coil at the outlet end. The extraction procedure was started by pumping deionized, degassed water with the HPLC pump at a constant flow rate thereby bringing the pressure up in the system to a value fixed by the back pressure regulator (approximately 750 psi). The system was tested for leaks, and then the temperature was increased to the required value for each run.

The experimental parameters assessed are listed in Table 1. The first study assessed a range of temperatures maintained in the temperature-controlled wherein the extraction vessel was mounted wherefrom a 30-mL/g extract was collected during each run. The remaining studies used a single temperature of 140° C. wherein multiple equal-volume samples were collected during each run. After each extraction run, the extraction vessel was removed and the stainless steel tubing was washed by pumping through ~100 mL of 50:50 (v/v) ethanol/tetrahydrofuran (THF) solvent mixture. Residual extracts collected from the solvent washes were concentrated by evaporation under nitrogen flow before analysis of lignans. The solid residues (i.e., extracted seeds) were removed from the cell, weighed, dried in a vacuum oven at 70° C. for about 24 h and ground before analysis. Extracts and extracted seeds were stored at −30° C.

Analysis of Lignans and Other Phenolics.

The direct hydrolysis method described by Eliasson et al. (2003. J. Chromatography 1012: 151-159) was followed for extraction and hydrolysis of lignans with minor modifications. In a 25 mL Erlenmeyer flask, 0.5 g of ground seeds or 0.5 g of solid residue sample were mixed with 1.0 mL of methanol, 4 mL of distilled water, and 5 mL of 2 N NaOH. Flasks were sealed with a rubber stopper and shaken on an orbital shaker for 1 hr at room temperature to hydrolyze SDG lignan precursor compounds. Then, 5 mL of 2N $H_2SO_4$ were added to neutralize the extract. The mixtures were then centrifuged at 11000×g for 10 min and the supernatants were collected. To each of two microcentrifuge tubes for each sample, 0.6 mL of the liquid and 0.9 mL of methanol were added. The solution was mixed and allowed to sit for 30 minutes before centrifuging for 5 min at 11000×g. The supernatant was then filtered through 0.45 μm filter prior to HPLC analysis. For the analysis of liquid extracts, the solid sample and 4 mL of water were replaced by 4 mL of the extract sample. Analysis was conducted on a HPLC system (Waters, Milford, Mass.) with a 717+autosampler, 600 pump and 996 PDA detector running under Empower software. SDG was separated on a Luna C-18 column (5 μm, 100 Å, 250×3 mm, with a guard column C-18 (4×2.0 mm) (Phenomenex, Torrance, Calif.) kept at 30° C. The injector temperature was 150° C. An injection volume of 30 μL was used. Solvents used were 0.025% trifluoroacetic acid (solvent A) and methanol (solvent B) with a gradient of t=0 min of 80% A and 20% B, t=44 min of 30% A and 70% B, t=46 min of 30% A and 70% B, t=52 min of 80% A and 20% B, and t=70 min of 80% A and 20% B. Data were collected with a diode array detector at 280 nm. Concentration of SDG, p-coumaric acid glucoside, and ferulic acid glucoside in the extracts were calculated from SDG, p-coumaric acid, and ferulic acid standard curves. SDG standard was obtained from ChromaDex (Santa Ana, Calif.).

Protein Determination.

Protein analyses were performed by two methods of analysis, the Bradford method (1976, Anal. Biochem. 72: 248-254) was used for the liquid extracts, and the total nitrogen method described by Sweeney (1989; JAOAC 72: 770-774) was used for the solid residues and ground seed samples. The Bradford protein assay is a simple procedure for determination of concentration of solubilized protein. Samples used were the liquid protein solutions from low polarity water extraction experiments. Protein contents of extracts were also calculated from the difference between initial total nitrogen percentages in ground flaxseeds and total nitrogen values in the solid residues after extraction.

Carbohydrates and Soluble Solids.

Total carbohydrates were determined by the phenol sulfuric acid method disclosed by Choi et al. (2004, J. Chromatog. 153-162).

Effects of Temperature on Subcritical Water Extraction.

The extraction of phenolic compounds from whole flaxseed was clearly affected by the temperature of the subcritical water used to extract the phytochemicals (Tables 2 and 3).

TABLE 1

System parameters evaluated for optimization of subcritical water extraction of phenolic compounds from whole flaxseed.

| Parameter | Temperature (° C.)$^a$ | Flow rate (mL/min) | Vessel dimensions (mm) | Seed weight (g) | Water/seed ratio (mL/g) | Bed depth (mm) |
|---|---|---|---|---|---|---|
| Temperature | 100 | 1 | 6.9 × 100 | 2 | 30 | 84 |
|  | 120 |  |  |  |  |  |
|  | 140 |  |  |  |  |  |
|  | 160 |  |  |  |  |  |
| Flow rate | 140 | 0.3 | 6.9 × 100 | 2 | sequential | 84 |
|  |  | 0.5 |  |  |  |  |
|  |  | 1.0 |  |  |  |  |
|  |  | 2.0 |  |  |  |  |
|  |  | 4.0 |  |  |  |  |
| Bed depth | 140 | 1 | 6.9 × 100 | 2 | sequential | 84 |
|  |  |  | 9.1 × 100 |  |  | 44 |
|  |  |  | 19.1 × 100 |  |  | 12 |
| Flow rate × bed depth | 140 | 0.5 | 6.9 × 100 | 2 | sequential | 84 |
|  |  | 0.9 | 9.1 × 100 |  |  | 44 |
|  |  | 4.0 | 19.1 × 100 |  |  | 12 |
| Seed weight × vessel size | 140 | 0.5 | 6.9 × 100 | 2 | sequential | 84 |
|  |  | 0.9 | 9.1 × 100 | 4 |  |  |
|  |  | 4.0 | 19.1 × 100 | 16 |  |  |
| Seed weight × bed depth | 140 | 0.5 | 6.9 × 200 | 2 | 40-45 | 66 |
|  |  |  |  | 3 |  | 107 |
|  |  |  |  | 4 |  | 141 |
|  |  |  |  | 5 |  | 174 |

TABLE 2

Effect of temperature on subcritical water extraction of phenolic compounds from whole flaxseed.

| Sample | Temp. (° C.) | SDG[1] Amount[2] | Yield[3] | p-coumaric acid glucoside Amount[2] | Yield[3] | ferulic acid glucoside Amount[2] | Yield[3] |
|---|---|---|---|---|---|---|---|
| subcritical water extract | 100 | 0.64 ± 0.03 | 5.4 | 0.10 ± 0.0 | 11.0 | 0.07 ± 0.0 | 15.3 |
| | 120 | 2.49 ± 0.2 | 21.2 | 0.23 ± 0.01 | 26.0 | 0.14 ± 0.01 | 30.1 |
| | 140 | 9.39 ± 0.7 | 79.4 | 0.74 ± 0.02 | 84.7 | 0.40 ± 0.01 | 84.4 |
| | 160 | 10.13 ± 0.5 | 86.2 | 0.76 ± 0.06 | 86.5 | 0.39 ± 0.03 | 81.9 |
| Solvent wash extract | 100 | 0.02 ± 0.01 | 0.16 | 0.02 ± 0.01 | 2.3 | 0.02 ± 0.0 | 3.4 |
| | 120 | 0.24 ± 0.3 | 2.1 | 0.04 ± 0.0 | 5.1 | 0.03 ± 0.0 | 5.7 |
| | 140 | 0.19 ± 0.07 | 1.7 | 0.03 ± 0.01 | 3.6 | 0.02 ± 0.0 | 3.5 |
| | 160 | 0.02 ± 0.01 | 0.2 | 0.03 ± 0.0 | 3.6 | 0.02 ± 0.0 | 4.3 |
| Seed residue | 100 | 10.12 ± 0.1 | 86.1 | 0.77 ± 0.04 | 87.7 | 0.40 ± 0.00 | 84.2 |
| | 120 | 8.11 ± 0.4 | 69.0 | 0.62 ± 0.03 | 71.1 | 0.32 ± 0.02 | 66.7 |
| | 140 | 1.20 ± 0.2 | 10.2 | 0.12 ± 0.02 | 13.6 | 0.06 ± 0.01 | 12.7 |
| | 160 | 0.12 ± 0.2 | 1.0 | 0.03 ± 0.0 | 3.4 | 0.02 ± 0.0 | 4.0 |

[1]Secoisolariciresinol diglucoside.
[2]Amounts are expressed in mg of compound per gram of seeds.
[3]Yields of compound are expressed in weight percentage of total content in seeds.

Extraction yields increased from 10% at 100° C. up to approximately 90% at 140-160° SDG, the major lignan present in flaxseeds, along with other two phenolic compounds, p-coumaric acid glucoside and ferulic acid glucoside were extracted with varied success at different temperatures in the low polarity water system (Table 2). In general, the extraction was most efficient at temperatures of 140-160° C. Extracted amounts of SDG were about 10 mg per gram of seed and yields were higher than 85% for extractions at 140-160° C.

TABLE 3

Phytochemical composition of subcritical water extracts from whole flaxseed extracted at 100°, 120°, 140°, and 160° C.[1]

| Temperature (° C.) | Soluble solids %[3] | Protein %[4] | %[5] | Total Carbohydrates % | Phenolic compounds % | SDG[2] % |
|---|---|---|---|---|---|---|
| 100 | 0.2 | 1.2 | 6.3 | 19.8 | 1.76 | 1.39 |
| 120 | 0.5 | 1.3 | 11.5 | 34.9 | 3.15 | 2.75 |
| 140 | 0.8 | 6.1 | 13.5 | 31.8 | 4.20 | 3.75 |
| 160 | 1.2 | 11.7 | 10.4 | 29.3 | 3.05 | 2.72 |

[1]Amounts are expressed in percent of the extract dry weight (dwb).
[2]Secoisolariciresinol diglucoside.
[3]Amounts are expressed in percent of the extract weight (wwb).
[4]Measured as total nitrogen percentage by combustion with a thermal conductivity detector multiplied by 5.41.
[5]Measured by the colorimetric Bradford dye binding assay as BSA equivalents.

Composition of the low polarity water extracts produced at 100, 120, 140, and 160° C. are presented in Table 3. Extraction of proteins, carbohydrates, and phenolic compounds continuously increased with the temperature from 100 to 160° C. The dry matter content of the extracts also increased. Thus, maximum amounts of proteins, carbohydrates, and phenolics were extracted at 160° C., but on a dry weight basis, the most concentrated extracts in terms of protein and phenolic compounds, were obtained at 140° C. Content of phenolic compounds represented about 4% of the dry extract weight at that temperature. Evidently the reduction on the percentages at 160° C. of all the components measured, even though the quantities extracted were higher, would be due to the increase on the extraction of other fractions not measured in this analysis. It is known that flaxseed contains about 39% to 45% as and about 1.8% to 3% as phytic acid. Since only one volume of extracts was collected during each run, it is likely that subcritical extraction of low polar lipids increased at 160° C. thereby increasing dry matter content of the extracts and decreasing dry weight basis percentages of components reported above.

Effect of Flow Rates and Through-Put Volumes on Subcritical Water Extraction.

The combination of the process variables, flow rates and through-put volumes, enable determination of the actual extraction times. The through-put volume is directly related to the weight of seed being extracted thereby resulting in a commonly used variable in solid-liquid extractions referred to as the liquid to solid (L/S) ratio. The flow rates enable determinations of the theoretical superficial velocities and residence times, i.e. the duration of time the water would be in contact with the seeds. The actual velocity of circulation through the seeds is also dependent on the porosity of the bed. In order to keep this variable unmodified, the same bed depth was used in all extraction runs of equal seed weights thereby enabling the density of the packed seeds to be constant. In extraction runs with different seed weights, the variable depths used were pre-determined in order to keep bed densities constant. The objective of these runs was to evaluate the effects of flow rates, and through-put volumes on subcritical water extraction efficiency of SDG in an extraction vessel having a 6.9-mm o.d. at a constant temperature of 140° C. Extract collections were made sequentially so that extraction volumes could be grouped in different ways to present the results as a functions of total volume extracted, extraction time or water-to-sample ratio.

Figure 4:
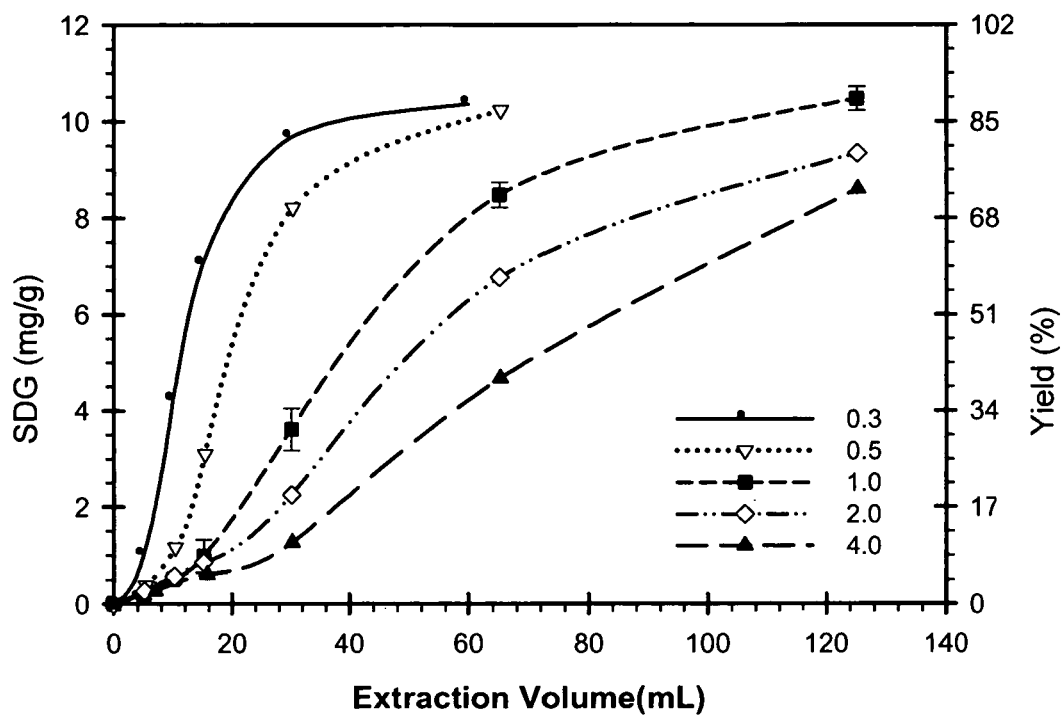
FIG. 4 shows the effects of flow rates and through-put volumes on subcritical water extraction of secoisolariciresinol diglucoside (SDG) from whole flax seeds.

Analysis of the data in FIG. 4 regarding the effects of flow rates and through-put volumes of subcritical water indicated most of the extraction process was regulated by the mass transfer of the solute from the surface of the solid into the bulk of the water. Both low flow rates (0.3 to 1 mL/min) in the whole range of extraction and high flow rates (1 to 4 mL/min) at high total volumes showed SDG yields varying with the flow rate. Plots of SDG yield as a function of the extraction volume showed a very steep yield increase at low rates of 0.3 and 0.5 mL/min, reaching a maximum with a water volume of about 60 mL. This total volume results in a final liquid to seed ratio of 30 mL/g of seed. However, decreasing the flow rate to 0.3 mL/min is not convenient, provided it did not improved considerably the yield in comparison with 0.5 mL/min extraction and it used the largest extraction time (221 min). Extraction at a flow rate of 1 mL/min reached similar yield and extraction time than 0.5 mL/min flow rate but only after 120 mL, resulting in more dilute extracts and a liquid to seed ratio of 60 mL/g. Superficial velocities from 0.64 to 2.75 cm/min and residence time from 3 to 13 min have been used in the best three treatments. Flow rates of 2 and 4 mL/min did not reach the maximum yield even after 120 mL. The extraction process had not reached the equilibrium as indicated by the 2 and 4 mL/min lines in FIG. 4, which were still increasing when the run was stopped.

Table 4 demonstrates the effects of flow rates on subcritical water extraction yields. At a volume of approximately 60 mL and a liquid-to-seed ratio of 32 mL/g, there were significant differences among the yields of the four larger flow rate treatments (FIG. 4 and Table 4). Yields of about 87-88% were the highest obtained with 0.3 and 0.5 mL/min and extraction times of 221 and 142 min, respectively. Lower yields of 72, 58, and 40% were reached with flow rates of 1, 2, and 4 mL/min, respectively. These results demonstrate that inadequate combinations of extraction volumes and flow rates can result in yield losses of 10% to 50%.

TABLE 4

Effects of flow rates on subcritical water extraction of SDG[1] from 2 g of flaxseed at 140° C.

| Flow (mL/ min) | Velocity[2] (cm/min) | Residence time (min)[3] | Volume (mL) | Extraction time (min) | SDG Amount[4] | SDG Yield[5] |
|---|---|---|---|---|---|---|
| 0.3 | 0.64 | 13.1 | 60.0 | 221.5 | 10.36 | 88.1 |
| 0.5 | 1.38 | 6.12 | 65.4 | 142.0 | 10.23 | 87.0 |
| 1.0 | 2.75 | 3.06 | 65.1 | 70.0 | 8.48 | 72.1 |
| 2.0 | 5.51 | 1.53 | 65.2 | 32.6 | 6.77 | 57.6 |
| 4.0 | 11.0 | 0.76 | 65.3 | 16.3 | 4.67 | 39.7 |

[1]Secoisolariciresinol diglucoside.
[2]Velocity was calculated as the ratio of flow rate to surface area of the cell.
[3]Calculated as ratios of bed depth (8.4 cm) to each superficial velocity.
[4]Amounts are expressed in mg of SDG per gram of seeds.
[5]Yields are expressed in weight percentage of the total content of SDG in the seeds.

In summary, a flow rate of 0.5 mL/min was the best for subcritical water extraction of lignans and other phytochemicals from flaxseed in a 6.9 mm ID cell with a bed depth of 84 mm. A total volume of 60-80 mL would be required at that flow rate to maximize the recovery. The increase in extraction yield obtained using lower flow rate was not significantly important and it would result in a two fold increase of the extraction time provided the speed of the extraction was not increased. On the other hand, the use of higher flow rates that increased the speed of the extraction required higher water volumes, yielded lower concentrations of extracts.

EXAMPLE 2

The effects of four independent processing factors, i.e., pH, temperature, packing materials introduced into extraction vessels with source plant materials, and manipulating the liquid-to-solvent (L/S) ratio, on the extraction efficiencies of subcritical water were assessed with flaxseed meal as the source plant material for lignans, proteins, carbohydrates and other phytochemicals. The subcritical extraction equipment and system were configured as described in Example 1 and illustrated in FIG. 1. Since it is known that solvent pH significantly affects the solubilities and extraction efficiencies of protein extractions, three volumes of pure water were adjusted individually to pHs of 4, 6.5, and 9, and were separately assessed in these studies. Increasing extraction temperatures were also assessed with each volume of pH-adjusted pure water to determine optimal extraction rates for lignans while avoiding their thermodegradation. Preliminary studies compared the suitability of different inert physical substrates including glass wool, glass beads, stainless steel wirecloth, silica sand, coiled stainless steel springs and membranes for use as packing materials for extraction vessels, and determined that for the extraction vessels described in Example 1, glass beads (3-mm dia.) provided better ease-of-handling and phytochemical yields. Consequently, glass beads were used as the physical inert packing substrates in the extraction runs described in this example. The speed of transfer of phytochemicals from source plant materials to solvents depends on the solute concentration and solvent gradient. The diffusion stops when the phytochemical concentrations in the solute and solvent reach equilibrium equilibrium. Therefore, 1:90 and 1:21 solid-to-liquid ratios were used to study the effects of the solvent volumes on yield of lignans extracted from flaxseed meals. Thirty extraction runs were conducted to assess the effects of different combinations of these independent processing factors on the subcritical water extraction of flaxseed meal. The factor combinations are listed in Table 5.

Figure 5:
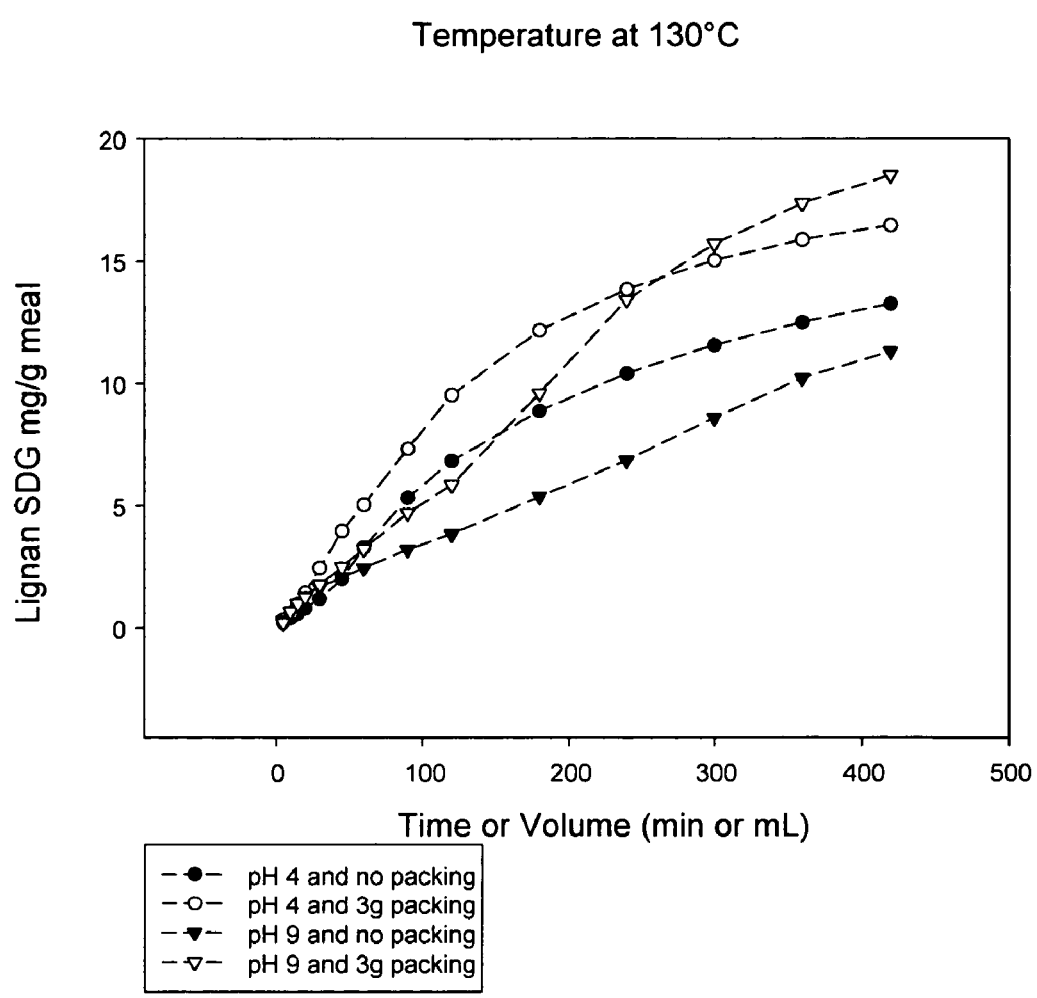
FIG. 5 shows the effects of pH and packing materials on extraction of SDG from flaxmeal with subcritical water maintained at 130° C.

FIG. 5 shows the effects of pH and packing of the extraction vessels with inert physical substrates on the extraction of SDG from flaxseed meal with subcritical water maintained at 130° C. Glass bead packing increased the amounts

TABLE 5

Combinations of independent processing factors assessed in subcritical water extraction of flaxmeal.

| Run | Temperature (° C.) | S/S ratio | pH | Packing (g) | Extraction time (h) |
|---|---|---|---|---|---|
| 1 | 130 | 1:90 | 4 | 0 | 3 |
| 2 | 130 | 1:90 | 4 | 3.8 | 3 |
| 3 | 130 | 1:90 | 9 | 0 | 3 |
| 4 | 130 | 1:90 | 9 | 3.8 | 3 |
| 5 | 130 | 1:21 | 4 | 0 | 7 |
| 6 | 130 | 1:21 | 4 | 3.8 | 7 |
| 7 | 130 | 1:21 | 9 | 0 | 7 |
| 8 | 130 | 1:21 | 9 | 3.8 | 7 |
| 9 | 160 | 1:90 | 4 | 0 | 3 |
| 10 | 160 | 1:90 | 4 | 3.8 | 3 |
| 11 | 160 | 1:90 | 9 | 0 | 3 |
| 12 | 160 | 1:90 | 9 | 3.8 | 3 |
| 13 | 160 | 1:21 | 4 | 0 | 7 |
| 14 | 160 | 1:21 | 4 | 3.8 | 7 |
| 15 | 160 | 1:21 | 9 | 0 | 7 |
| 16 | 160 | 1:21 | 9 | 3.8 | 7 |
| 17 | 190 | 1:90 | 4 | 0 | 3 |
| 18 | 190 | 1:90 | 4 | 3.8 | 3 |
| 19 | 190 | 1:90 | 9 | 0 | 3 |
| 20 | 190 | 1:90 | 9 | 3.8 | 3 |
| 21 | 190 | 1:21 | 4 | 0 | 7 |
| 22 | 190 | 1:21 | 4 | 3.8 | 7 |
| 23 | 190 | 1:21 | 9 | 0 | 7 |
| 24 | 190 | 1:21 | 9 | 3.8 | 7 |
| 25 | 160 | 1:15 | 6.5 | 0 | 5 |
| 26 | 160 | 1:15 | 6.5 | 0 | 5 |
| 27 | 160 | 1:15 | 6.5 | 0 | 5 |
| 28 | 160 | 1:15 | 6.5 | 3.8 | 5 |
| 29 | 160 | 1:15 | 6.5 | 3.8 | 5 |
| 30 | 160 | 1:15 | 6.5 | 3.8 | 5 | of SDG extracted at both pH 4 and 9. When packing materials were not added to the extraction vessels, relatively more SDG was extracted with subcritical water having a pH of 4 compared to water with a pH of 9. However, when extraction vessels were packed with glass beads and flax meal, more SDG was extracted with pH 9 water compared to pH 4. These trends were consistent when either extraction volumes or times of extraction were varied.

Figure 6:
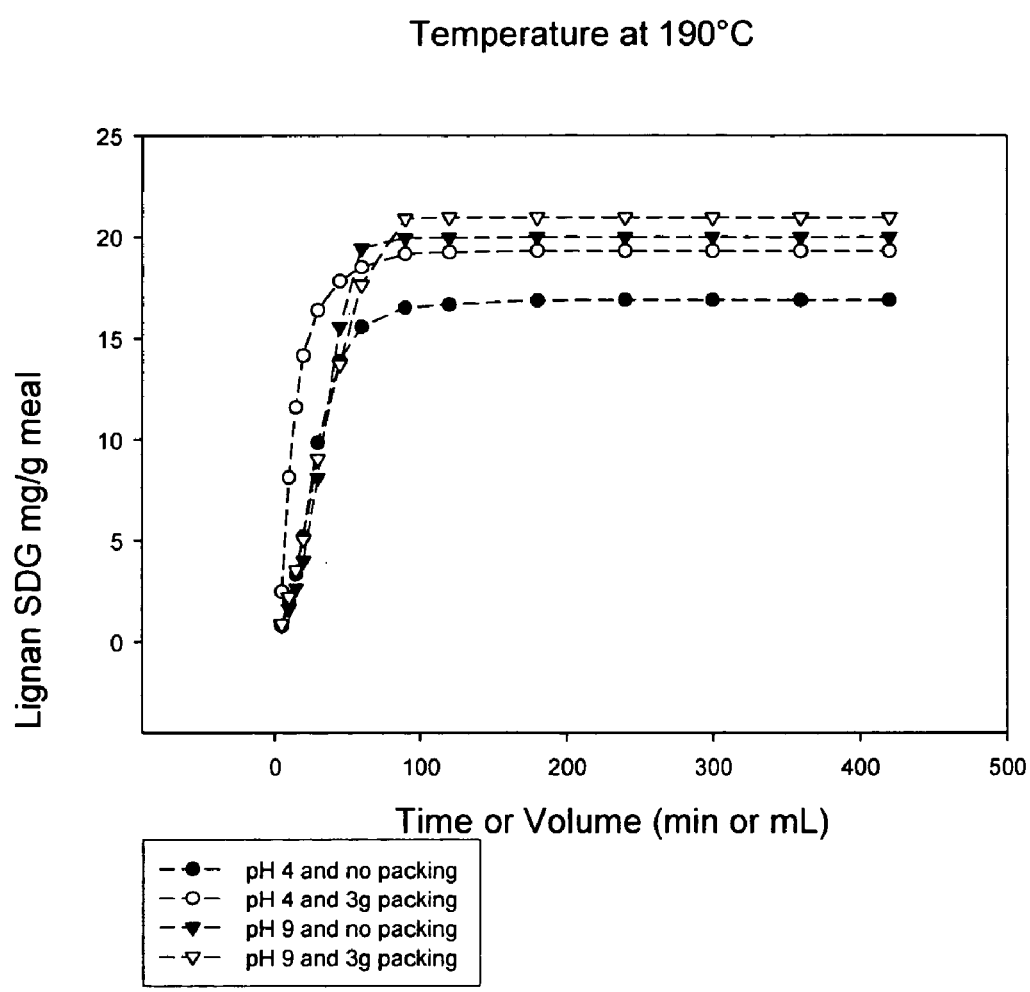
FIG. 6 shows the effects of pH and packing materials on extraction of SDG from flaxmeal with subcritical water maintained at 190° C.

FIG. 6 shows the effects of pH and of co-packing the extraction vessels with inert physical substrates commingled with flaxmeal, on the extraction of SDG from flaxseed meal with subcritical water maintained at 190° C. The most rapid and efficient extractions were achieved with subcritical water having a pH of 9 flowing through extraction vessels packed with flaxmeal commingled with inert physical substrates.

Figure 7:
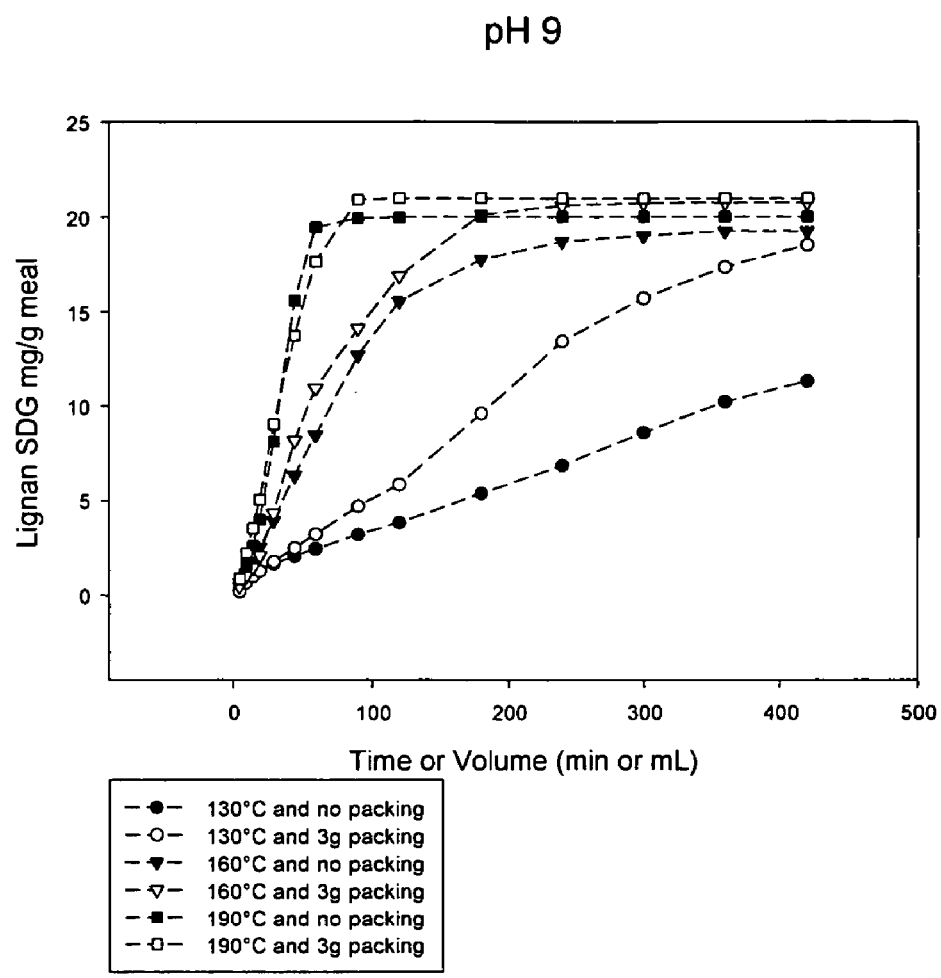
FIG. 7 shows the effects of temperature and packing materials on extraction of SDG from flaxmeal by subcritical water with a pH of 9.

FIG. 7 shows the effects of packing and temperature on extraction of SDG with subcritical water having a pH of 9. Rates of extraction were greatest when subcritical water was maintained at 190° C., and decreased progressively as the temperature was reduced to 160° C. and 130° C. Packing extraction vessels with glass beads enhanced extraction at lower temperatures.

Table 6 shows the combination effects of the four independent processing variables on sequential extraction of three phytochemical classes, i.e., proteins, carbohydrates, and lignans, from flaxmeal with subcritical water. The data demonstrate that the present invention is useful for extraction of multiple classes of polar and nonpolar phytochemicals during the course of one extraction operation. Furthermore, these data show that it is possible to tailor the methods of the present invention to preferentially extract certain classes of phytochemicals while ensuring efficient extraction of other desireable phytochemicals. Using flaxmeal as source plant material for example, extraction of lignans can be maximized by maintaining subcritical water with a pH of 9 at a temperature in the range of 160° to 180° C., while flowing through extraction vessels packed with an inert physical substrate, while at the same time providing adequate extractions of proteins and carbohydrates. Alternatively, carbohydrate yields can be maximized by maintaining subcritical water with a pH of 4 at a temperature in the range of 130° to 160° C., while flowing through which conditions will also provide adequate extractions of proteins and lignans.

TABLE 6

Effects of combinations of independent processing factors on sequential extractions of proteins, carbohydrates, and lignans from flaxmeal with subcritical water.

| Run | Temp. (° C.) | Solvent volume (mL) | pH | Packing (g) | Protein (mg/g)$^a$ | Total carbohydrate (mg/g) | Total soluble solids$^b$ | Lignans (mg/g)$^c$ |
|---|---|---|---|---|---|---|---|---|
| 1 | 130 | 180 | 4 | 0 | 104.9 | 112.5 | 20.0 | 7.5 |
| 2 | 130 | 180 | 4 | 3 | 120.1 | 148.7 | 20.5 | 10.7 |
| 3 | 130 | 180 | 9 | 0 | 113.0 | 54.3 | 23.0 | 6.4 |
| 4 | 130 | 180 | 9 | 3 | 167.3 | 125.0 | 24.0 | 13.0 |
| 5 | 130 | 420 | 4 | 0 | 68.1 | 171.4 | 18.5 | 13.3 |
| 6 | 130 | 420 | 4 | 3 | 85.3 | 205.0 | 18.5 | 16.5 |
| 7 | 130 | 420 | 9 | 0 | 163.1 | 120.2 | 26.5 | 11.3 |
| 8 | 130 | 420 | 9 | 3 | 257.1 | 190.3 | 27.5 | 18.5 |
| 9 | 160 | 180 | 4 | 0 | 98.9 | 191.1 | 22.5 | 16.5 |
| 10 | 160 | 180 | 4 | 3 | 101.5 | 201.9 | 23.0 | 18.4 |
| 11 | 160 | 180 | 9 | 0 | 135.8 | 112.5 | 26.0 | 12.9 |
| 12 | 160 | 180 | 9 | 3 | 189.0 | 135.3 | 27.0 | 15.7 |
| 13 | 160 | 420 | 4 | 0 | 37.1 | 114.0 | 18.0 | 14.7 |
| 14 | 160 | 420 | 4 | 3 | 45.0 | 112.0 | 17.0 | 18.6 |
| 15 | 160 | 420 | 9 | 0 | 286.6 | 143.9 | 24.0 | 19.2 |
| 16 | 160 | 420 | 9 | 3 | 233.7 | 164.2 | 24.0 | 20.8 |
| 17 | 190 | 180 | 4 | 0 | 15.95 | 135.5 | 17.0 | 16.8 |
| 18 | 190 | 180 | 4 | 3 | 97.2 | 161.5 | 23.0 | 17.3 |
| 19 | 190 | 180 | 9 | 0 | 288.4 | 125.0 | 29.7 | 18.8 |
| 20 | 190 | 180 | 9 | 3 | 261.3 | 154.2 | 30.0 | 20.3 |
| 21 | 190 | 420 | 4 | 0 | 36.7 | 68.5 | 18.0 | 16.9 |
| 22 | 190 | 420 | 4 | 3 | 31.0 | 42.2 | 17.6 | 19.3 |
| 23 | 190 | 420 | 9 | 0 | 219.3 | 85.6 | 24.8 | 20.0 |
| 24 | 190 | 420 | 9 | 3 | 231.2 | 91.9 | 25.0 | 21.0 |
| 25 | 160 | 300 | 6.5 | 0 | 116.3 | 139.8 | 19.7 | 16.9 |
| 26 | 160 | 300 | 6.5 | 0 | 167.4 | 148.6 | 21.3 | 17.8 |
| 27 | 160 | 300 | 6.5 | 0 | 143.5 | 162.7 | 22.0 | 18.3 |
| 28 | 160 | 300 | 6.5 | 3 | 203.2 | 176.0 | 22.0 | 19.8 |
| 29 | 160 | 300 | 6.5 | 3 | 203.7 | 181.6 | 21.3 | 19.5 |
| 30 | 160 | 300 | 6.5 | 3 | 190.3 | 183.3 | 21.8 | 19.5 |

$^a$Protein yields were determined with the Bradford assay.
$^b$Total soluble solids determined as mg sucrose/g sample with a Brix refractometer.
$^c$Lignan yields expressed as SDG equivalents.

Figure 8:
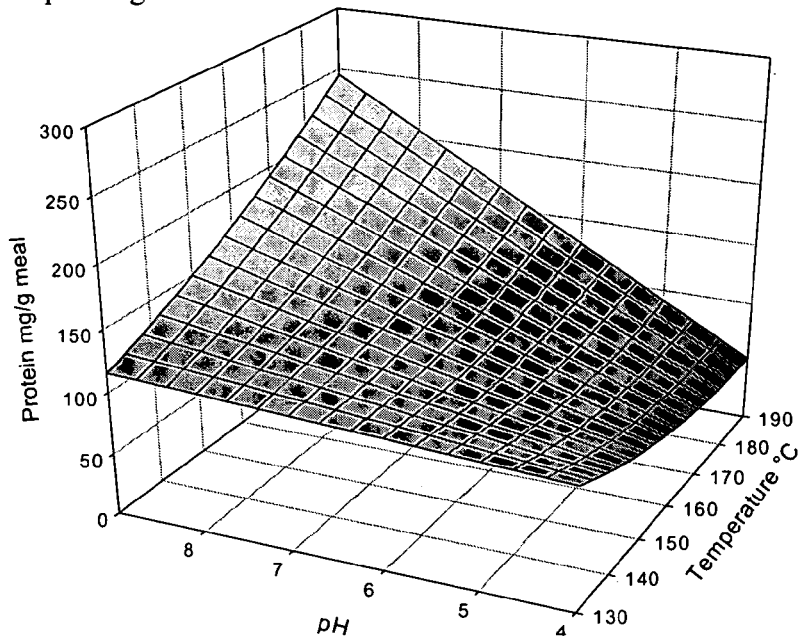
FIG. 8 shows the effects of pH and temperature on the extraction of proteins from flaxmeal with 180 mL/g of subcritical water.
Figure 8:
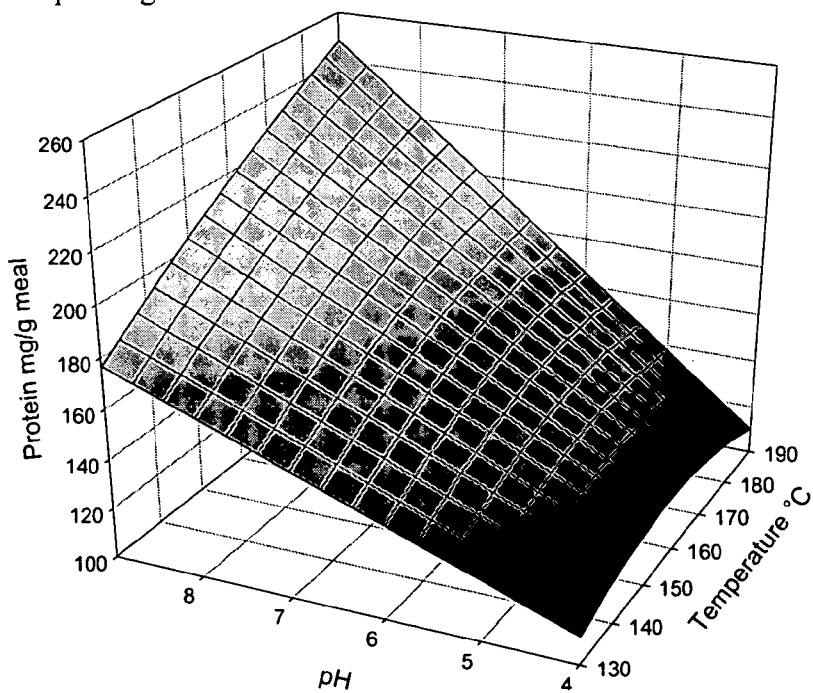
Figure 9:
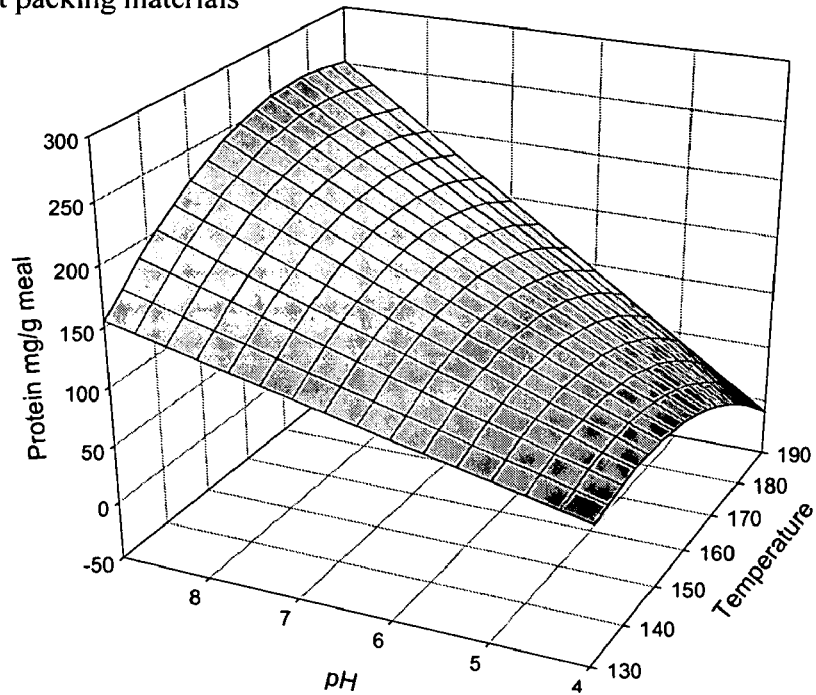
FIG. 9 shows the effects of pH and temperature on the extraction of proteins from flaxmeal with 420 mL/g of subcritical water.
Figure 9:
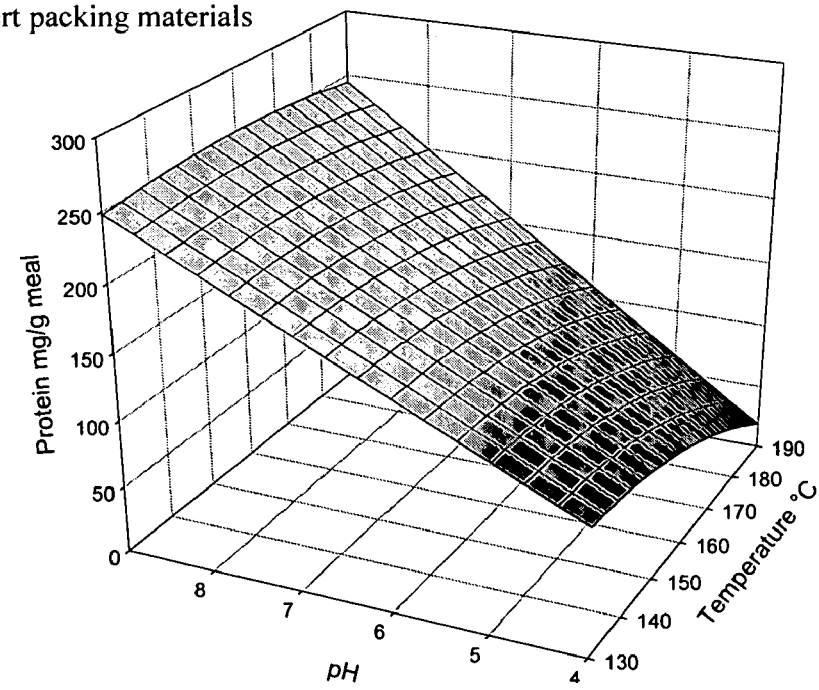

Surface response plots (FIGS. 8a and 8b) show that maximum extraction of proteins with subcritical water was achieved with conditions of 190° C., pH 9 and 180-mL of solvent volume. Similar protein yields were also obtained at 170° C., pH 9 and a 420-mL volume of subcritical water (FIGS. 9a and 9b). These data show that extraction of proteins with subcritical water can be done with either: (a) a longer extraction period, i.e., by slowing the rate of subcritical water flow through the extraction vessel, or alternatively, (b) using larger volumes of subcritical water at faster flow-through rates. In all conditions tested in this example, lower quantities of protein were extracted by acidified subcritical water, and as the pH levels were raised, the amounts of protein extracted increased (FIGS. 8 and 9). Increasing the temperature of subcritical water flowing through the extraction vessel increased the amounts of protein extracted, with the largest effect occurring with pH 9 (FIGS. 8 and 9). Co-packing the flax meal into extraction vessels with inert packing materials increased the protein yield in all extractions performed in this example (FIGS. 8 and 9).

EXAMPLE 3

Cow cockle (*Sapponaria vaccaria* L.) seeds were used as source plant material to assess the usefulness of the present invention for subcritical water co-extraction of saponins with carbohydrates. The system was configured as illustrated in FIG. 1 and included the following components: (a) a glass reservoir containing pure water, an HPLC pump (515 model, Waters, Mississauga, ON, Canada), (b) a 4.0-m preheating coil, (c) an extraction vessel, (d) a temperature-controlled oven (5700A Series, Hewlett-Packard, Palo Alto, Calif., USA), (e) a 1.0-m cooling coil, (f) a back-pressure regulator with a 750-psi cartridge (Scientific Products and Equipment, Concord, ON, Canada), and (g) multiple collection vessels for receiving sequential extract volumes. The components were interconnected with stainless steel tubing having a 1.25-mm outer diameter (o.d.) using fittings adequate to withstand high pressures. Components (b) and (c), i.e., the preheating coil and extraction vessel, were mounted inside component (d). Three, 20-cm long stainless steel extraction vessels were used for different extraction runs discussed in this example, with the first vessel having i.d of 3.7 mm, the second vessel having an i.d. of 5.7 mm, and the third vessel having an i.d of 7.5 mm. The extraction vessel was connected to the stainless steel tees with column fittings equipped with flits to prevent clogging of the lines with the tees interconnected with the stainless steel lines. The tees were used to withdraw samples for analyses during the course of an extraction operation. All of the extraction runs conducted in runs summarized in this example used the following method. A measured amount of source plant material, either whole or ground cow cockle seeds, was loaded into the column. The bed depth was measured and glass wool placed at the column outlet and inlet. In a typical run, the system was pressurized by pumping water into the system wherein the back-pressure regulator was in a closed position. After the desired temperature was reached thereby producing subcritical water, the back-pressure regulator was opened thereby allowing from the extraction vessel a flow of eluent containing extracted phytochemicals. The first 10 mL (equivalent to the dead volume resident in the extraction vessel during pressurizing) collected was discarded. Timed sequential extract fractions were then collected in separate collection vessels for the duration of the extraction operation. Each extraction operation was stopped by stopping solvent flow after which, the system was washed with 30 mL of a nonpolar solvent, i.e, methanol. Extraction residue (R) and fractions (F) were freeze-dried to remove the solvent. The wash solutions obtained by washing the extractor ($W_1$) (and the filters ($W_2$) used during preparation of the samples for saponin analysis were dried with a vacuum evaporator. A total of 19 extraction runs were conducted using combinations of independent processing variables as listed in Table 7.

TABLE 7

Combinations of independent processing factors assessed in subcritical water extraction of cow cockle seed materials.

| Run | Seed weight (g) | Seed type | Bed depth (cm) | Vessel i.d. (mm) | Temperature (° C.) | Glass beads | Frit |
|---|---|---|---|---|---|---|---|
| 1 | 4.0 | whole | 7.1 | 7.5 | 100 | — | 10μ |
| 2 | 4.0 | whole | 7.1 | 7.5 | 100-250 | — | 10μ |
| 3 | 2.0 | whole | 3.5 | 3.7 | 100-250 | — | 10μ |
| 4 | 3.0 | whole | 5.4 | 5.7 | 100-250 | — | 10μ |
| 5 | 3.0 | whole | 5.4 | 5.7 | 150 | — | 10μ |
| 6 | 2.0 | whole | 3.5 | 3.7 | 150 | — | 10μ |
| 7 | 2.0 | whole | 3.5 | 3.7 | 125 | — | 10μ |
| 8 | 2.0 | whole | 3.5 | 3.7 | 175 | — | 10μ |
| 9 | 2.0 | ground | 3.5 | 3.7 | 150 | — | 10μ |
| 10 | 2.0 | ground | 3.5 | 3.7 | 125 | 2 g | 10μ |
| 11 | 2.5 | ground | 3.5 | 3.7 | 150 | — | 10μ |
| 12 | 2.0 | ground | 3.5 | 3.7 | 150 | 11 mL | 10μ |
| 13 | 2.0 | ground | 3.5 | 3.7 | 125 | 10 mL | screen |
| 14 | 2.0 | ground | 3.5 | 3.7 | 125 | 10 mL | 140μ |
| 15 | 4.0 | ground | 3.5 | 3.7 | 125 | 8 g | 140μ |
| 16 | 2.0 | whole | 3.5 | 3.7 | 150 | — | 10μ |
| 17 | 2.0 | whole | 3.5 | 3.7 | 125 | — | 10μ |
| 18 | 2.0 | whole | 3.5 | 3.7 | 125 | — | 10μ |
| 19 | 2.0 | whole | 3.5 | 3.7 | 125 | — | 100μ |

Runs 1 and 5-19 were conducted with a constant temperature maintained in the oven wherein the extraction vessels were mounted thereby maintaining the subcritical water at the same temperature for the duration of the extraction operation. During runs 2-4, the oven temperatures were sequentially raised from 100° to 250° C. thereby precisely manipulating and adjusting the temperature of the sibcritical water solvent during the extraction operation. The details of the temperature gradients used and collection of extracts eluted during each temperature period are shown in Table 8.

TABLE 8

Temperature gradients and extract collection during extraction runs 2-4 (from Table 7).

| Period* | Temperature* (° C.) | Time (min) | Fraction # |
|---|---|---|---|
| 1 | 100 | 15 | 1 |
| 2 | 100-125 | 12 | 2 |
| 3 | 125 | 15 | 3 |
| 4 | 125-150 | 13 | 4 |
| 5 | 150 | 15 | 5 |
| 6 | 150-175 | 15 | 6 |
| 7 | 175 | 15 | 7 |
| 8 | 175-200 | 17 | 8 |
| 9 | 200 | 15 | 9 |
| 10 | 200-225 | 21 | 10 |
| 11 | 225 | 15 | 11 |
| 12 | 225-250 | 23 | 12 |
| 13 | 250 | 15 | 13 |

*Temperatures during Periods 2, 4, 6, 8, 10, and 12 were increasing.

Compositional analysis of cow cockle seeds and the fractions obtained during extraction of cow cockle seed included total carbohydrate content analysis using phenol-sulphuric acid method described by Dubois et al. (1956, Anal. Chem.

28: 350-356) and Fox et al. (1990, Anal Biochem. 195: 93-96), and HPLC analyses of saponins and aglycones.

Figure 10:
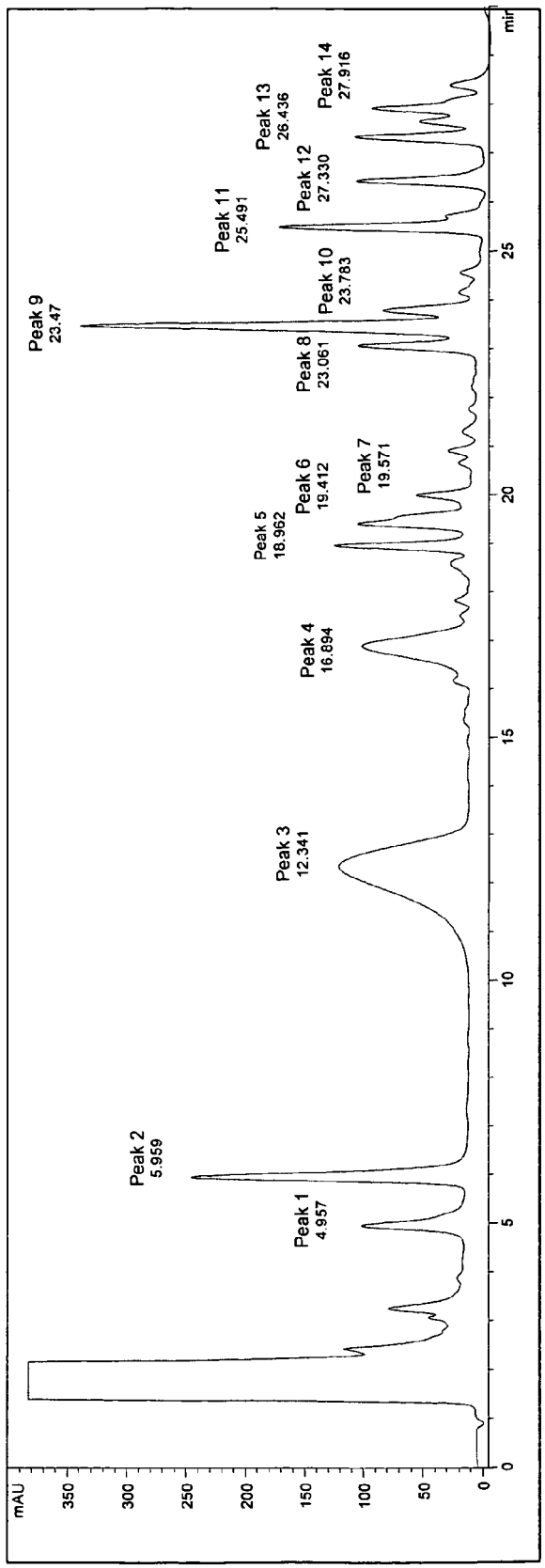
FIG. 10 shows an HPLC chromatogram of a methanol extract of cow cockle seeds.
Figure 11:
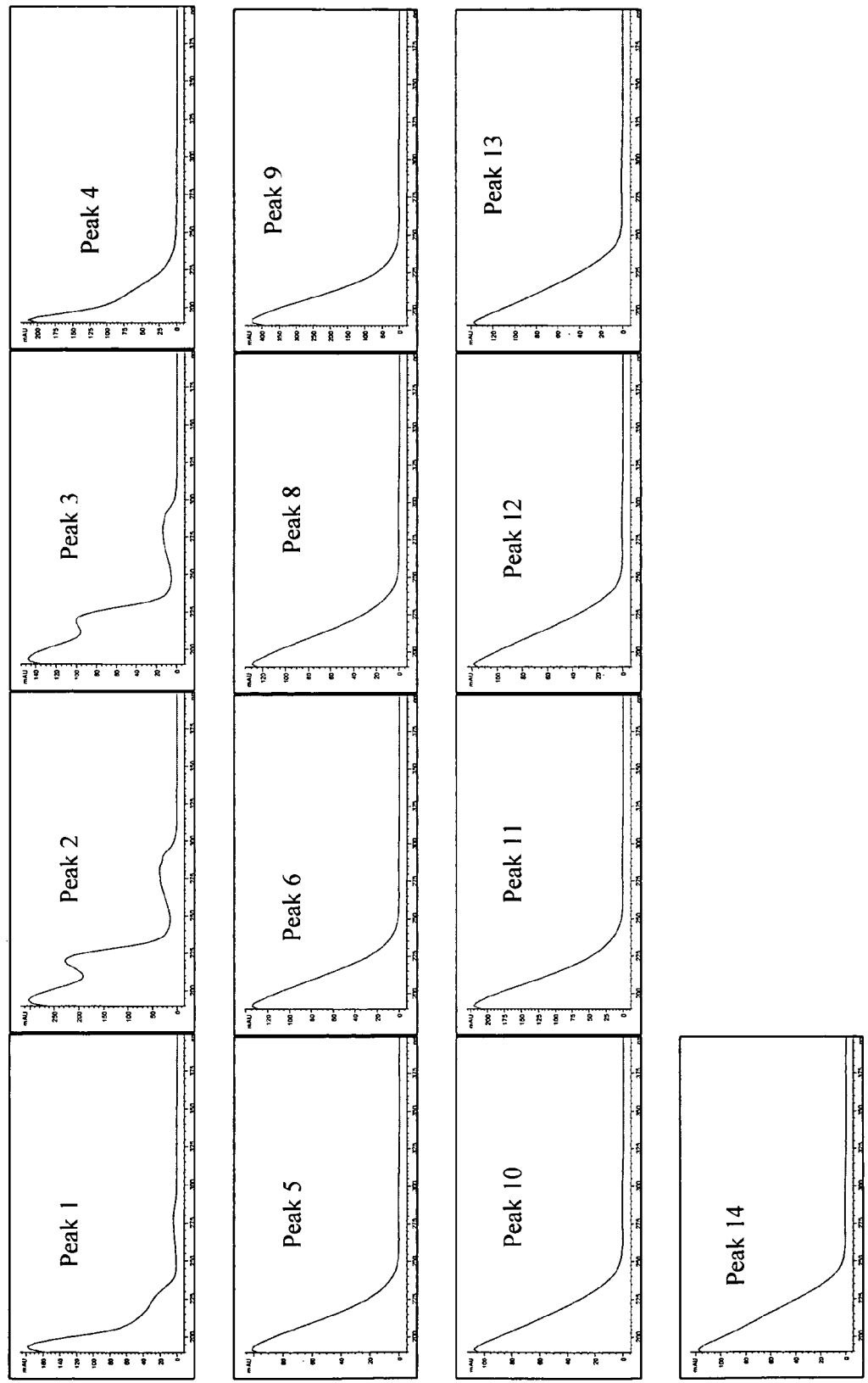
FIG. 11 shows the spectra of the individual peaks shown in FIG. 10.
Figure 12:
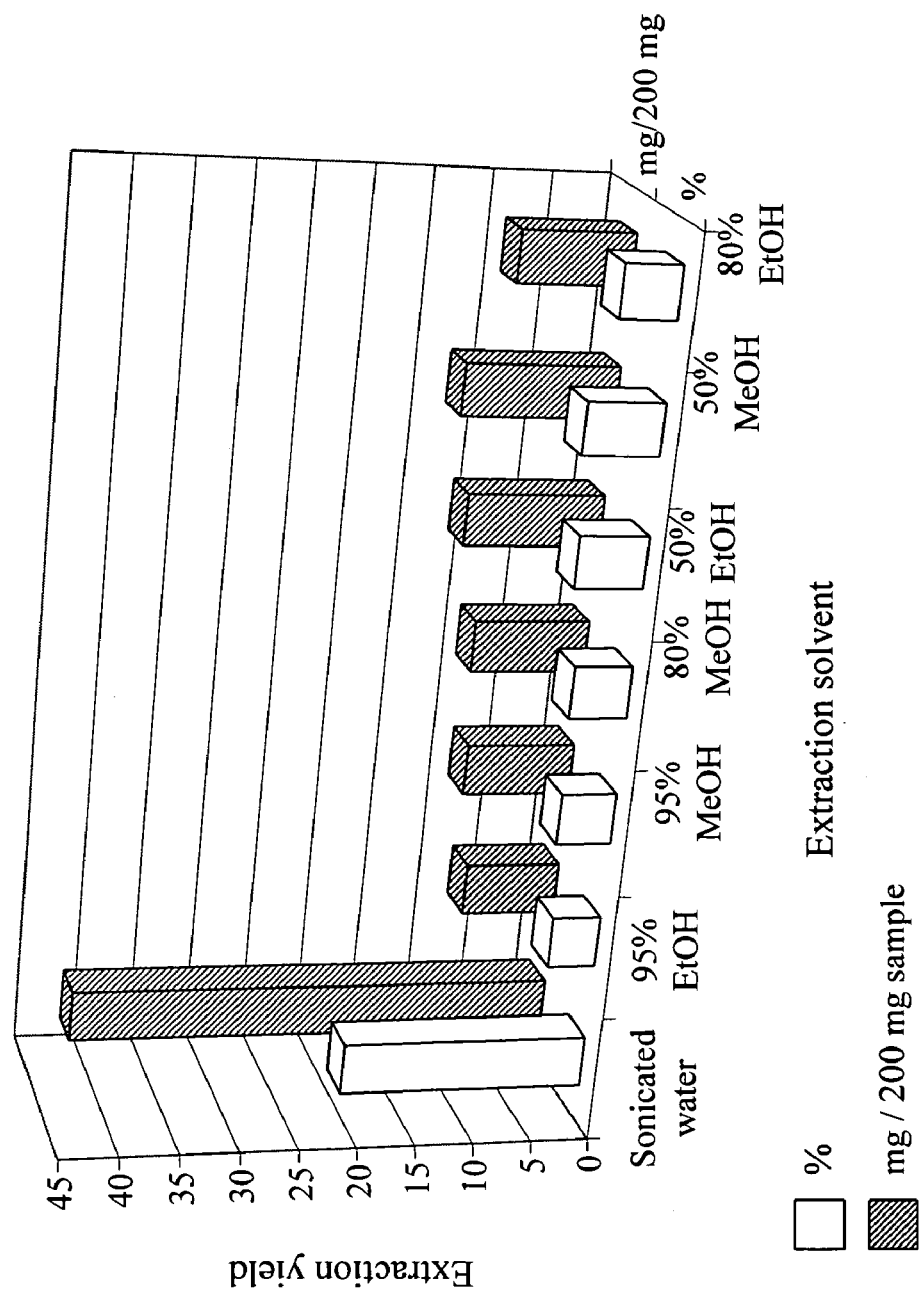
FIG. 12 shows comparisons of total phytochemical yields from water and organic solvent extractions of ground cow cockle seeds.

To provide a positive control for assessments of the equipment, system and methods of the present invention, saponins were extracted from ground cow cockle seeds with methanol, then separated by HPLC after which the spectra of the individual saponins were analyzed following the method disclosed by Oleszek (1988, J. Sci. Food Agric. 44: 43-49). FIG. 10 shows that 10 individual saponin compounds (i.e., peaks 4-14) were extracted from cow cockle with a low-polar aliphatic alcohol solvent. The spectra of these compounds are shown in FIG. 11. The fourteen major peaks in the HPLC chromatograms (FIG. 10) were used to trace the effect of extraction method (solvent, system set-up and operating conditions) on the yields and compositions of the fractions. While peaks 1, 2 and 3 had spectra corresponding to cyclopeptides, the spectra of the later peaks (4-14) were consistent with those of saponins (FIG. 10). While HPLC areas of the fourteen major peaks in the chromatograms were used to study the fractional extraction of saponins, quantitative saponin analyses of the solvent extracts and selected subcritical water extracts were carried out to determine the effects of temperature and sample pretreatments on saponin yield and composition. Glycyrrhizic acid ammonium salt (75% purity, Sigma-Aldrich Canada Ltd., Oakville, ON, Canada) was used as an external standard for the quantitative determination of saponins. Additional positive control data using sonicated water and low-polarity aliphatic alcohol solvents, i.e., ethanol, ethanol:water and methanol:water mixtures) were obtained by following the methods disclosed by Mazza et.al. (1992, J. Agric. Food Chem. 40: 1520-1523), for further comparisons with and assessment of subcritical water extraction of the present inventions. The positive control data are shown in Table 9a and FIG. 12. Highest total phytochemical yields were achieved by sonicated water extraction (42 mg corresponding to 21% of the seed material) compared to the organic solvents. Addition of water (up to 50%) to the alcohol solvents resulted in increases in saponin extraction yields in the positive controls from 4.1 to 5.8% for ethanol, and

TABLE 9

Comparison of total phytochemical and saponin extraction efficiencies between subcritical water and low-polarity organic solvents.

| Solvent | Total Yield | | Saponin Yield | | Saponin Concentration |
|---|---|---|---|---|---|
| | mg | % | mg | % | % |
| (a) Solvent Extraction[a] | | | | | |
| sonicated water | 41.8 | 20.9 | 2.22 | 53.9 | 5.3 |
| ethanol | 8.2 | 4.1 | 0.10 | 2.5 | 1.3 |
| methanol | 9.3 | 4.7 | 0.37 | 9.0 | 4.0 |
| 80% methanol | 9.9 | 4.9 | 3.83 | 92.9 | 38.9 |
| 50% ethanol | 11.7 | 5.8 | 4.13 | 100 | 35.3 |
| 50% methanol | 13.1 | 6.5 | 3.83 | 92.8 | 29.3 |
| 80% ethanol | 9.7 | 4.8 | 3.20 | 77.6 | 33.2 |
| (b) Subcritical Water Extraction[b] | | | | | |
| (b1) Whole seeds at 125-175° C. | | | | | |
| 125° C.-15 min | 32.2 | 1.6 | 3.67 | 8.9 | 11.4 |
| 125° C.-45 min | 78.9 | 3.9 | — | — | — |
| 125° C.-3 hr | 411 | 20.5 | 13.9 | 34.1 | 3.4 |
| 150° C.-45 min | 62.9 | 31.5 | — | — | — |
| 150° C.-2 hr-total ext | 1402.3 | 70.1 | 32.6 | 79.1 | 2.3 |

TABLE 9-continued

Comparison of total phytochemical and saponin extraction efficiencies between subcritical water and low-polarity organic solvents.

| Solvent | Total Yield | | Saponin Yield | | Saponin Concentration |
|---|---|---|---|---|---|
| | mg | % | mg | % | % |
| 1 hour | 879.4 | 44.0 | 24.6 | 59.5 | 2.8 |
| 2 hour | 522.9 | 26.1 | 8.1 | 19.5 | 1.5 |
| 175° C.-45 min | 1404 | 70.2 | — | — | — |
| (b2) Ground seeds at 125° C. | | | | | |
| 45 min total extract | 277.8 | 13.9 | 7.2 | 17.4 | 2.6 |
| 15 min | 207.5 | 10.4 | 6.35 | 15.4 | 3.1 |
| 30 min | 52.6 | 2.6 | 0.50 | 1.2 | 1.0 |
| 45 min | 17.7 | 0.9 | 0.32 | 0.08 | 1.8 |

[a]200 mg ground cow cockle seeds were extracted with 10 mL of solvent under ultrasonication conditions.
[b]2 g seeds were extracted with a 2 mL/min flow rate of subcritical water.

4.7 to 6.5% for methanol. Table 10 shows a comparison of the extraction efficiencies for individual saponins with sonicated water compared with two low-polarity organic solvents, ethanol and methanol.

TABLE 10

Comparison of extraction efficiencies for individual saponins by subcritical water, ethanol and methanol[a].

| Peak No.[b] | Extraction solvent | | |
|---|---|---|---|
| | Subcritical water | 80% ethanol | 80% methanol |
| 4 | 18 | 20 | 20 |
| 5 | 25 | 8 | 12 |
| 6 | 11 | 7 | 8 |
| 7 | 16 | 3 | 4 |
| 8 | 10 | 6 | 5 |
| 9 | 15 | 26 | 25 |
| 10 | 3 | 6 | 5 |
| 11 | 0 | 8 | 7 |
| 12 | 0 | 5 | 5 |
| 13 | 1 | 6 | 5 |
| 14 | 1 | 5 | 4 |

[a]Expressed as % of total saponin content.
[b]Peak numbers correspond to FIG. 10.

These extraction efficiencies are contrasted with those achieved with subcritial water extraction in Table 9(b1) & (b2). While 4-21% of the ground feed material were extracted using water, alcohols, and water/alcohol mixtures (Solvent/Feed=50, 45 min, 10 ml solvent, 200 mg ground seed), yields of subcritical water extraction of whole seeds at 125-175° C. (Solvent/Feed=45, 45 min, 90 mL solvent, 2 g seed) were in the range of 4-70% of the cow cockle seeds and increased with temperature (Table 9(b1)&(b2)). Sample pretreatments, i.e., grinding the seeds prior to extraction, increased the yield at 125° C. by a factor of 3.5.

Figure 13:
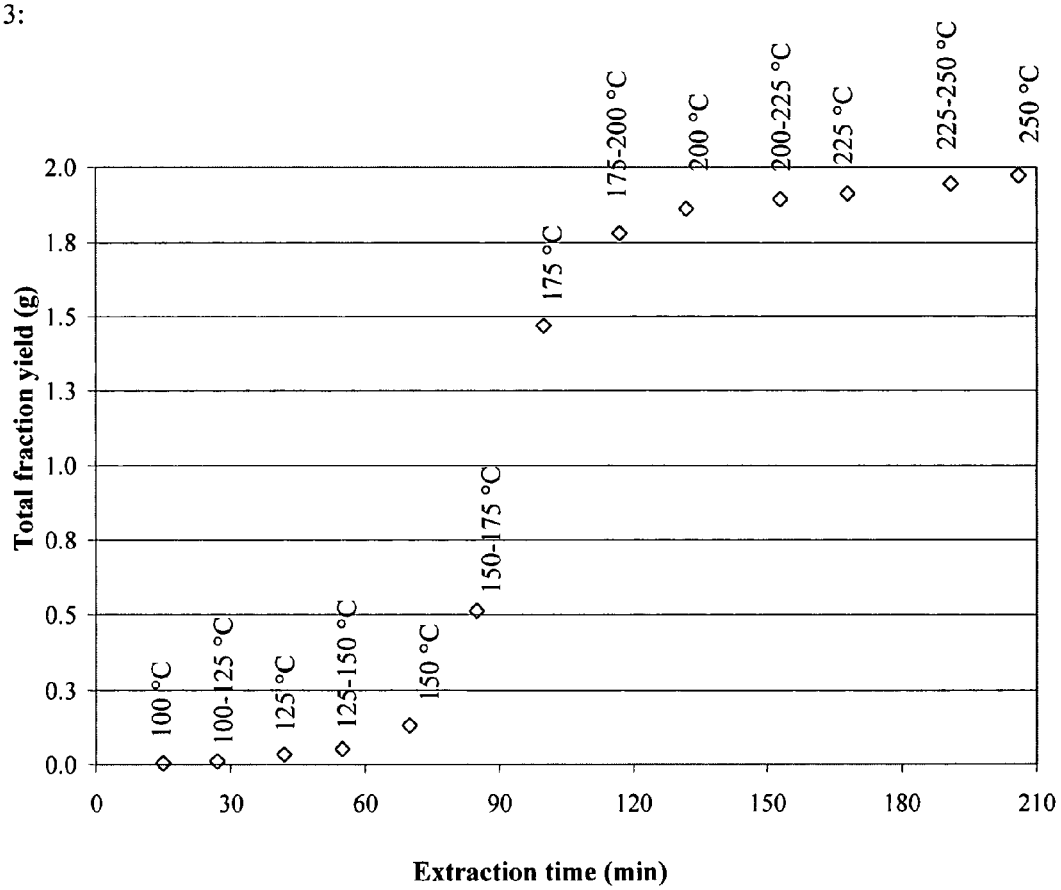
FIG. 13 shows the effects of manipulating temperatures during subcritical water extraction on total phytochemical yields from cow cockle seeds.
Figure 14:
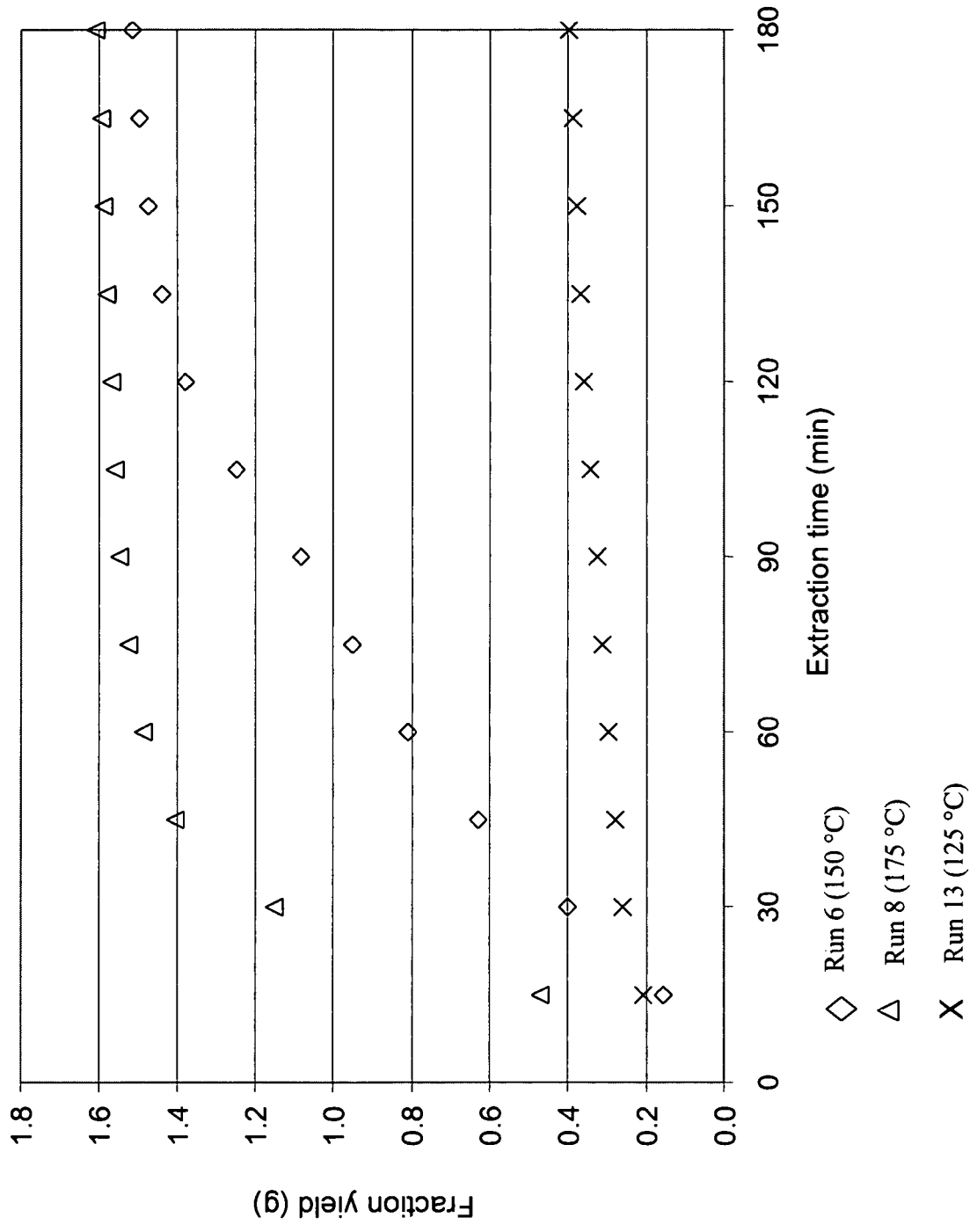
FIG. 14 shows the yields of total phytochemicals extracted from cow cockle seeds with subcritical water under isothermal conditions.

FIG. 13 shows the effects of incremental temperature increases on subcritical extraction of saponins during the course of the extraction operation during run 3, while FIG. 14 shows the efficiencies of saponin extractions under the isothermal temperature conditions of runs 6 to 8. While the 150 and 175° C. curves reached a plateau at around 90 min and 135 min respectively, the total extraction yield continued to increase with time throughout the 3 hr extraction at 125° C. At 175° C., 24% of the feed material was extracted in the first 15 min compared to 7.8% and 1.6% at 150 and 125° C. respectively. An hour of extraction yielded 74, 40 and 5% of the feed material to be extracted at 175, 150 and 125° C. respectively.

After 3 hr, the extraction yield at 150° C. (76%) was comparable to that at 175° C. (80%), but significantly higher than that obtained at 125° C. (20%). Grinding the seeds increased the total extraction yield at 125° C.

Figure 15:
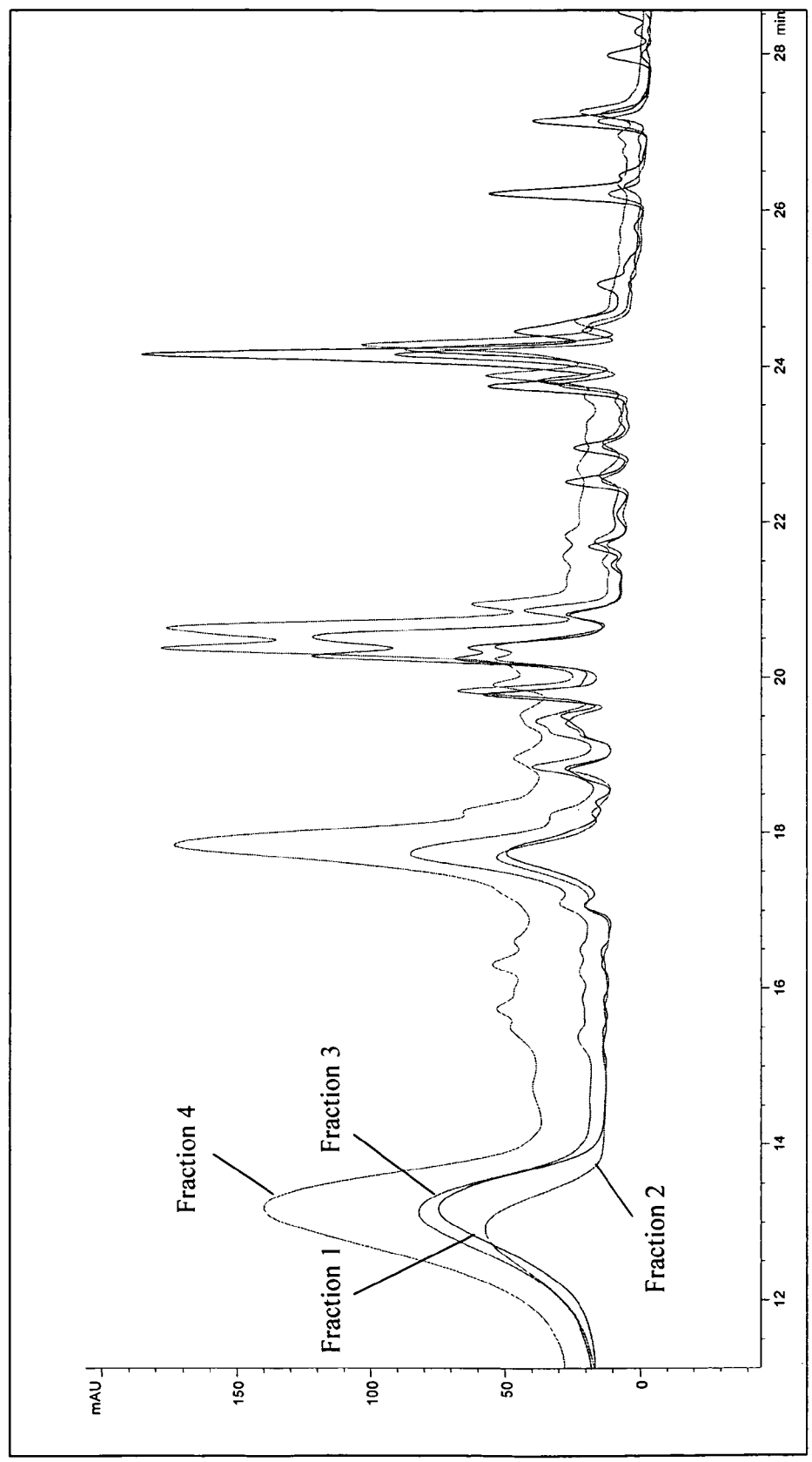
FIG. 15 shows HPLC chromatograms of the saponins present in the sequential fractions collected during subcritical water extraction of whole cow cockle seeds under an incremental temperature gradient that ranged from 100° to 250° C.

Saponin concentrations of the subcritical water extracts were dependent on temperature and time of the extraction as shown in Table 9(b1) and FIG. 15. Saponins were concentrated in the earlier fractions collected at all the temperatures investigated (FIG. 15). While subcritical water extraction of whole seeds at 125° C. for 15 min yielded an extract containing 11.4% saponins, saponin concentration in the 3-hr total extract was 3.4%. However, saponins recovered in the first 15 min corresponded to only 8.9% of total saponins due to low yield of this fraction, whereas 34.1% of the saponins were extracted after 3 hours (Table 9(b1)). The concentration of saponins decreased with temperature such that the first fraction (15 min) at 125° C. had the highest concentration. Furthermore, the relative concentrations of the individual saponins varied among the sequential fractions (Table 11).

The concentrations of saponins extracted in the ground seed eluent fractions (Run 13) were lower than concentrations of saponins extracted in the whole seed eluent fractions (Run 6) extracted by subcritical water maintained at 125° C. (Table 9(b)). The saponin yields and contents of the first fractions collected at 125° C. were comparable to that of the first fraction collected at 150° C. when whole cow cockle seeds were used as the source plant material. However, the saponin contents of the 125° C. fractions did not decrease with extraction times as occurred at 150° C. for whole seeds.

Figure 16:
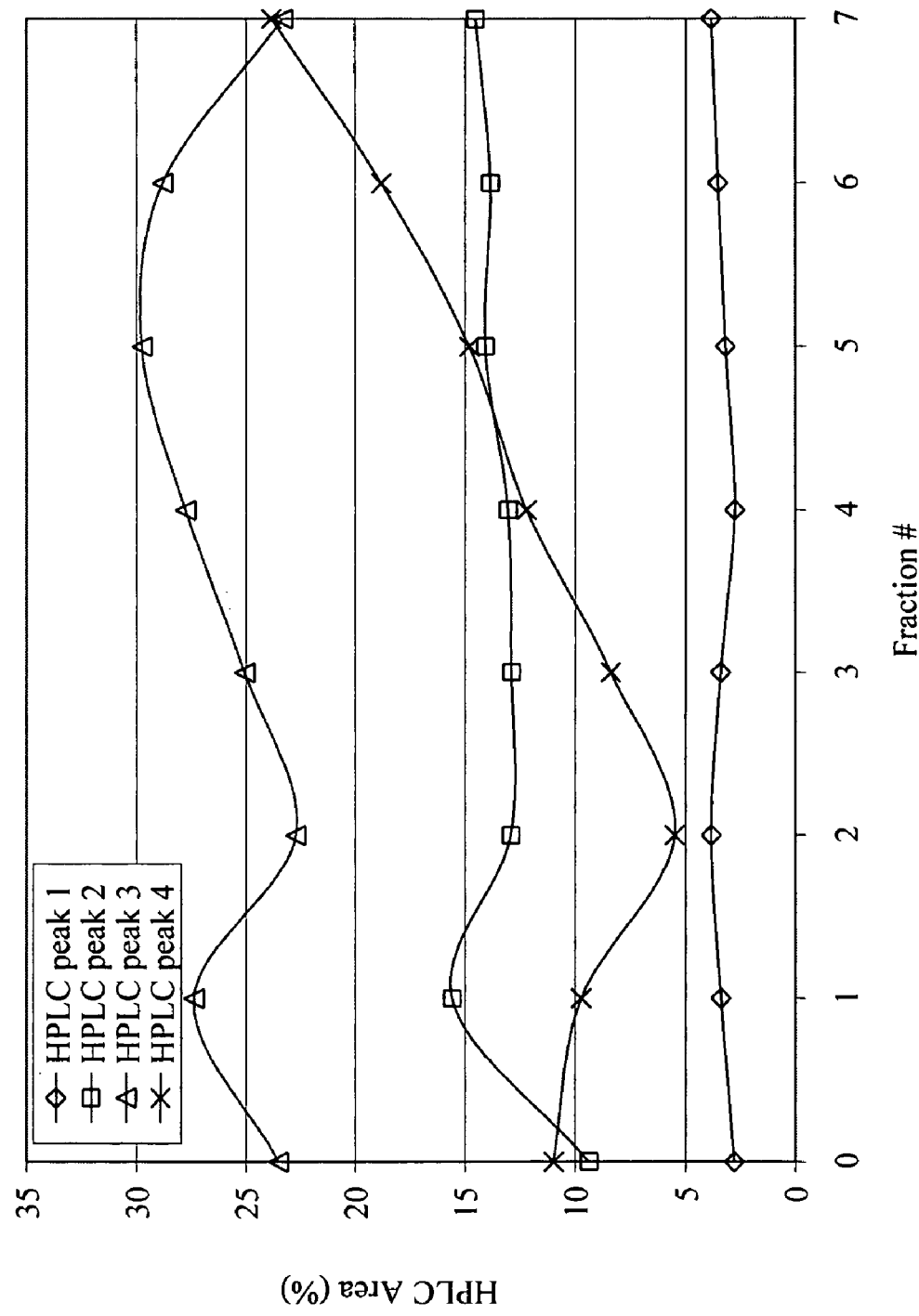
FIG. 16 shows cyclopeptides present in sequential fractions collected during subcritical water extraction of whole cow cockle seeds under an incremental temperature gradient that ranged from 100° to 250° C.
Figure 17:
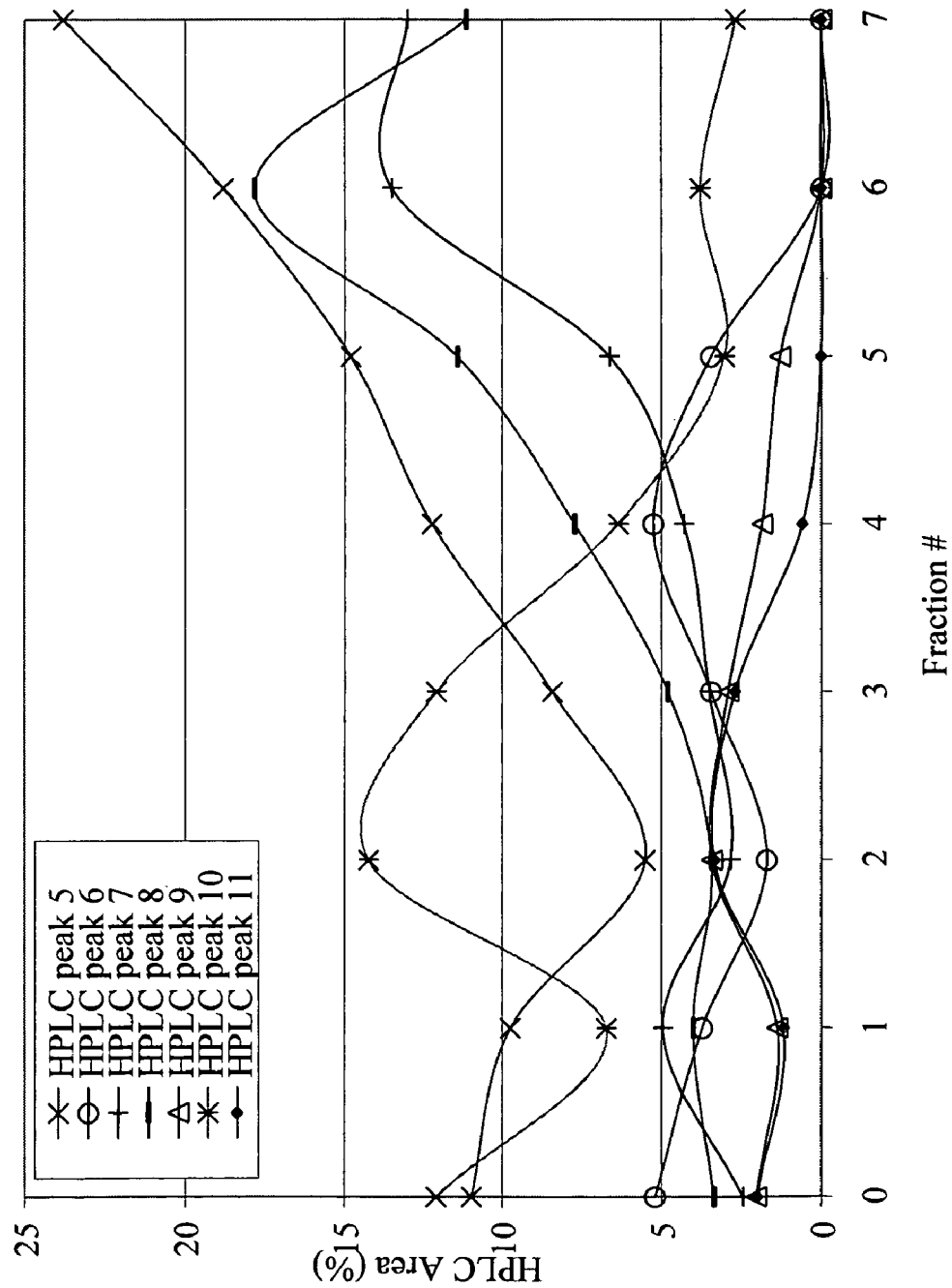
FIG. 17 shows saponins present in sequential fractions obtained during subcritical water extraction of whole cow cockle seeds under an incremental temperature gradient that ranged from 100° to 250° C.

Compositions of saponins present in the eluent fractions collected during subcritical water extractions during an incremental temperature gradient, were calculated using the HPLC area % of the 14 major peaks shown in FIG. 10. FIGS. 15, 16 and 17 and Table 12 show analyses of the liquid fractions (numbered as listed in Table 8) collected during Run 4 show that different quantities of individual saponins are extracted as the temperature of subcritical water is increased incrementally during an extraction operation.

TABLE 11

Comparison of individual saponins eluted in sequential fractions collected during subcritical water extraction at 125° C.[a].

| Peak No.[b] | Fraction 1 | Fraction 2 | Fraction 3 |
|---|---|---|---|
| 4 | 22 | 30 | 37 |
| 5 | 18 | 17 | 14 |
| 6 | 13 | 18 | 21 |
| 7 | 10 | 18 | 20 |
| 8 | 5 | 2 | 1 |
| 9 | 23 | 15 | 7 |
| 10 | 5 | 0 | 0 |
| 11 | 2 | 0 | 0 |
| 12 | 2 | 0 | 0 |
| 13 | 0 | 0 | 0 |
| 14 | 0 | 0 | 0 |

[a]Expressed as % of total saponin content.
[b]Peak numbers correspond to FIG. 10.

Figure 18:
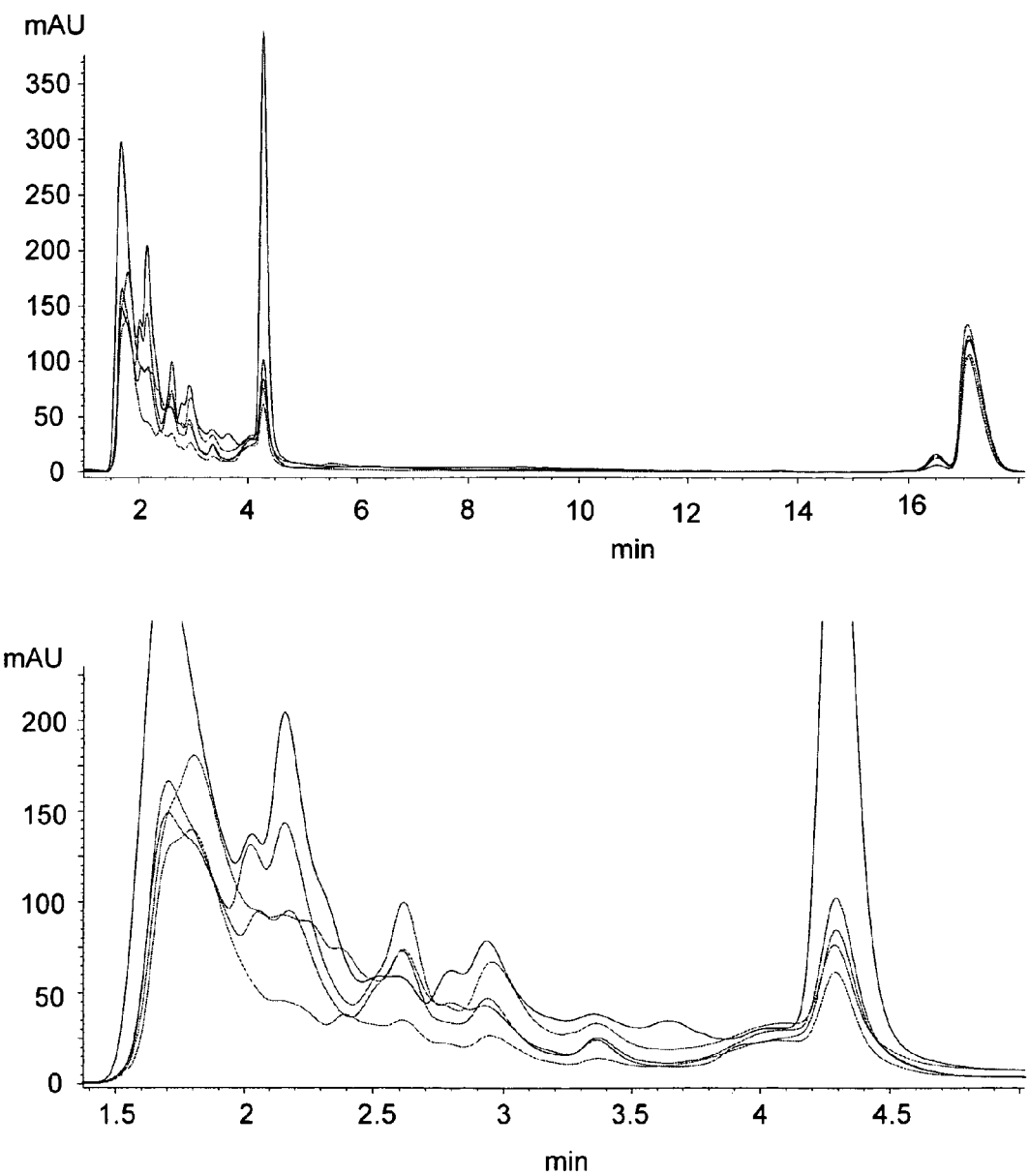
FIG. 18 shows HPLC chromatograms of the aglycones present in sequential fractions extracted under an isothermal subcritical water condition maintained at 125° C.
Figure 19:
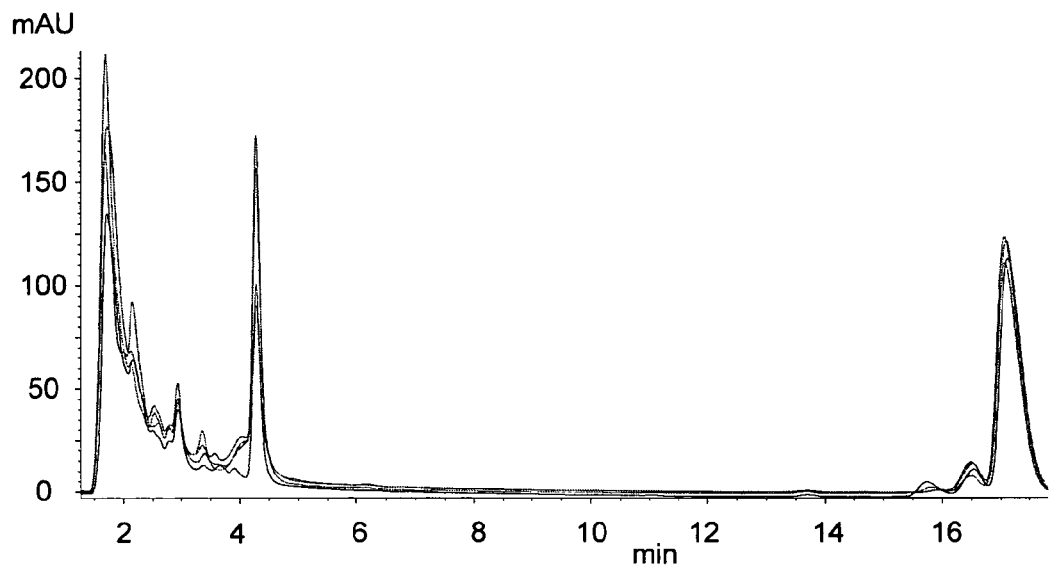
FIG. 19 shows HPLC chromatograms of the aglycones present in sequential fractions extracted under an isothermal subcritical water condition maintained at 150° C.
Figure 19:
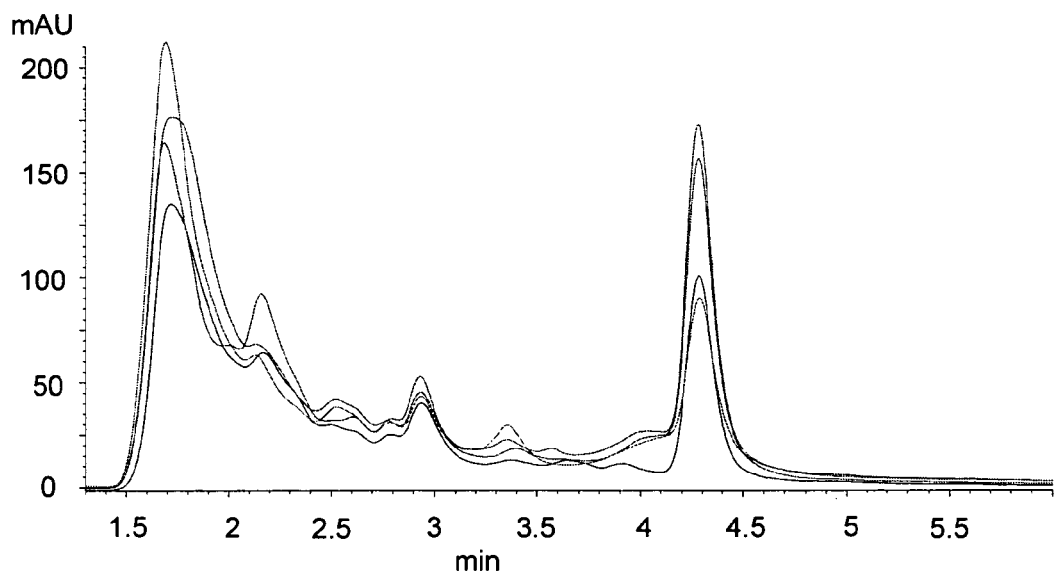
Figure 20:
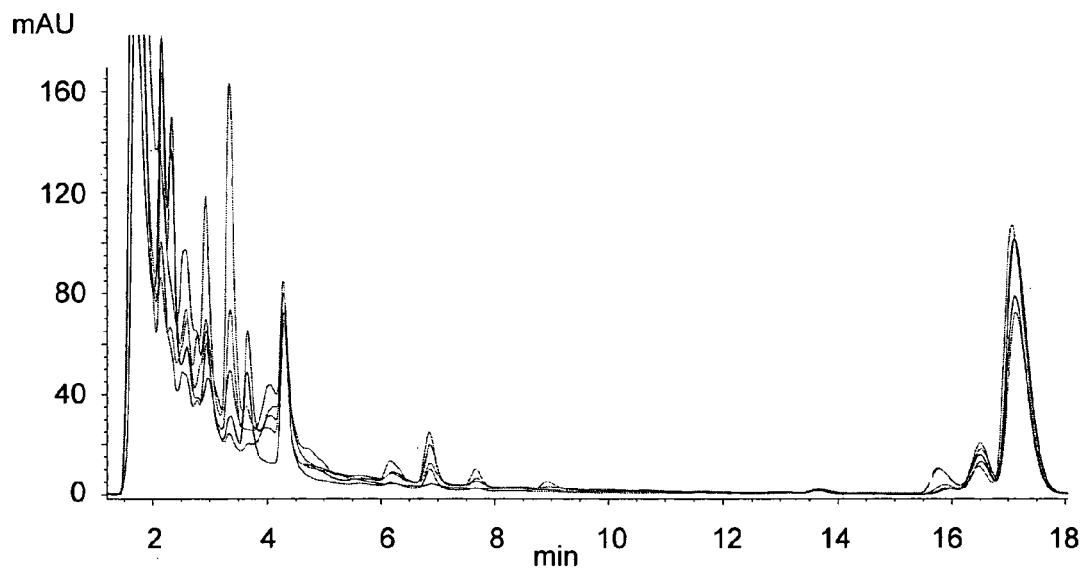
FIG. 20 shows HPLC chromatograms of the aglycones present in sequential fractions extracted under an isothermal subcritical water condition maintained at 175° C.
Figure 20:
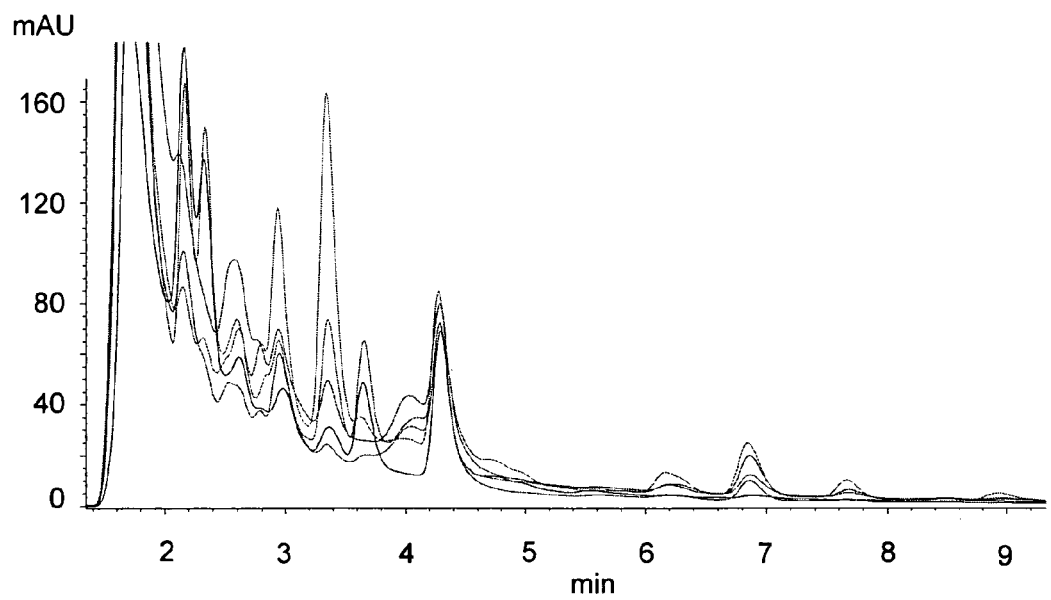

FIGS. 18, 19, and 20 demonstrate the presence of aglycone compounds co-extracted with saponins in sequential fraction samples collected during subcritical water extraction of whole cow cockle seeds in the runs as listed in Table 8.

Total carbohydrate contents of the source cow cockle seed material and sequential subcritical water extract fractions were determined using the phenol-sulphuric acid method. A separate standard curve was constructed for each set of analysis. Sample concentrations were adjusted to keep the absorbance readings in the range of 0.2 and 1.0 to ensure the linearity of the standard curves. The results are shown in Table 12.

TABLE 12

Total carbohydrate contents of selected fractions collected during subcritical water extraction of cow cockle seeds.

| Sample | CHO content |
|---|---|
| Cow cockle seed | 8-12% |
| 125° C. - 35 min* | 68.2% |
| 125° C. - 70 min | 99.6% |
| 125° C. - 180 min | 97.1% |
| 150° C., F1, 1 hr | 55.1% |
| 150° C., F2, 2 hr | 63.0% |

*Fraction collection time

Total carbohydrate content of the water extracts of ground cow cockle seeds was calculated to be 8-12% (this number only represents the carbohydrates extracted under the assay conditions and do include the starch content of the seed material.) Total carbohydrate content of 125° C. fractions increased from 68% to 99.6% as the extraction time doubled from 35 to 70 min. The total extract at 125° C. (3 hr) contained 97.1% total carbohydrates. Total carbohydrate contents of 150° C. fractions (1 and 2 hr) were determined to be 55.1 and 63.0% respectively using SpectramaxPlus with a quartz microplate reader.

These data illustrate the usefulness of the equipment, system and methods of the present invention for extraction of multiple classes of saponin compounds in addition to aglycones and carbohydrates during one extraction operation.

EXAMPLE 4

Blackcurrant berries have dark coloration due to high concentrations of anthocyanin pigments in their skins and pulp materials. It is known that anthocyanins have strong antioxidant properties which are of interest for pharmaceutical and nutraceutical applications. Blackcurrant berries also contain large amounts of colourless phytochemicals including flavonols, phenolic acids and proanthocyanidins. Blackcurrant flavonols are present primarily in the form of glycosides of myricetin, quercetin, and kaempferol. Blackcurrant berries are rich in hydroxycinnamic acid derivatives, particularly caffeic and p-coumaric acids. Blackcurrant seeds are also known to contain significant quantities of γ-linolenic acid (GLA), a polyunsaturated fatty acid which has important health-related properties.

Figure 21:
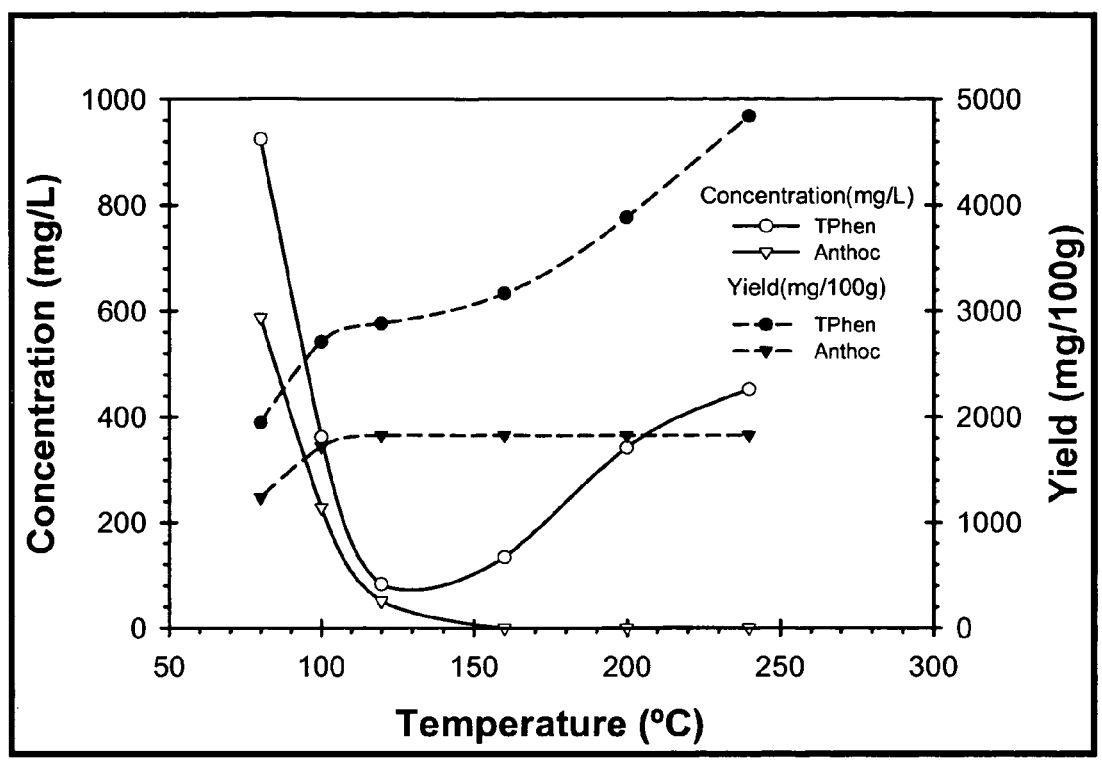
FIG. 21 shows total phenolics and anthocyanins extracted from blackcurrant berries with subcritical water under an incremental temperature gradient that ranged from 80° to 240° C.
Figure 22:
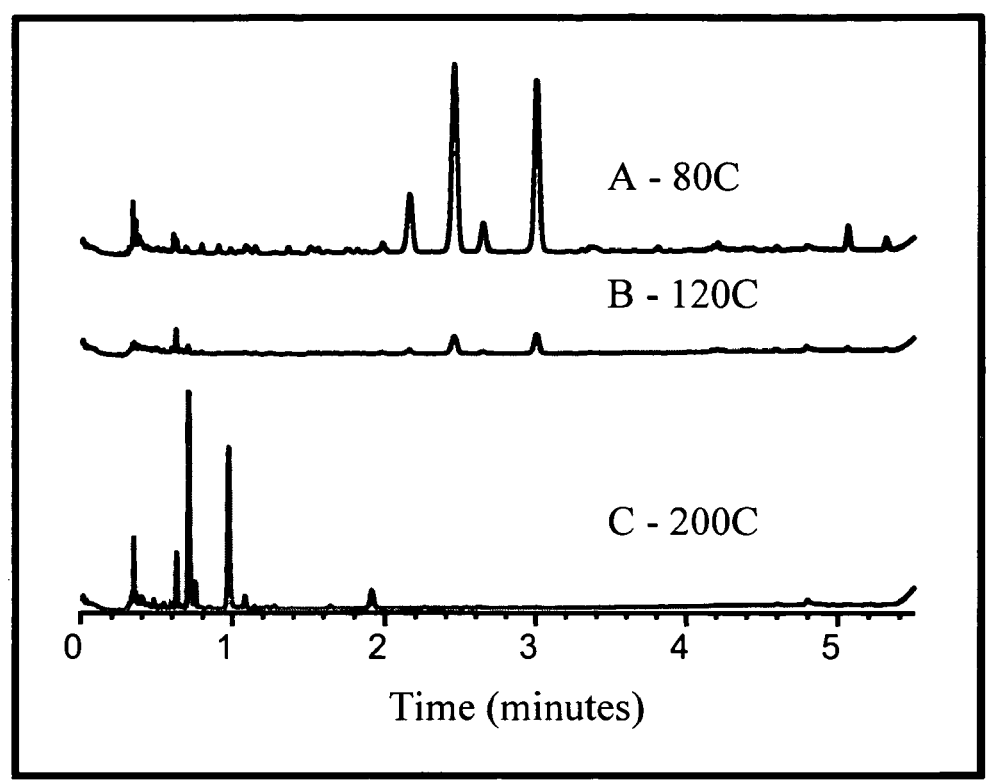
FIG. 22 shows HPLC chromatograms of three sequential blackcurrant berry eluent fractions extracted with subcritical water.

A sequential-temperature extraction of frozen blackcurrant berries with subcritical water was performed under an incremental temperature gradient that ranged from 80° C. to 240° C. The system was configured and operated as illustrated in FIG. 1 and described in Example 3. The flow rate of subcritical water through the extraction vessel was 1 mL/min for the duration of the extraction process. The temperature gradient was 15 min at each of 80° C., 100° C., 120° C., 160° C., 200° C. and 240° C. Eluent fractions were sequentially collected at 15-min intervals throughout the duration of the extraction process. The total phenolic concentration of the extracts decreased as the temperature gradient was increased from 80° C. to 120° C. during which-time the extraction yield reached a plateau (FIG. 21). However, as the temperature was further increased incrementally up to 240° C., the concentration and the yield of phenolics increased continuously with the temperature (FIG. 21). HPLC chromatograms of eluent fractions collected at 80° C., 120° C., and 200° C. (FIG. 22) showed that high polarity compounds were extracted at the initial lower temperatures, and that their content in the extraction vessel decreased with further extraction. The major black currant components extracted at 80° C. were cyanidin 3-glucoside, delphinidin 3-glucoside, cyanidin 3-rutinoside, and delphinidin 3-rutinoside (FIG. 22). The increase in yield at 200° C. was attributed to the extraction of newly generated high polarity compounds either by de novo extraction or by hydrolysis of polymeric compounds. These newly generated compounds appeared as new peaks at the beginning of the chromatograms of the extracts collected at 200° C. (FIG. 22).

EXAMPLE 5

Parsley is known to contain flavone phytochemicals such as apigenin, luteolin and flavonols, quercetin and isorhamnetin, which have potent estrogenic activity. Such flavones are commonly extracted from the aerial parts of parsley with organic solvents, preferably methanol. Parsley is also known to have antioxidant and diuretic properties.

Figure 23:
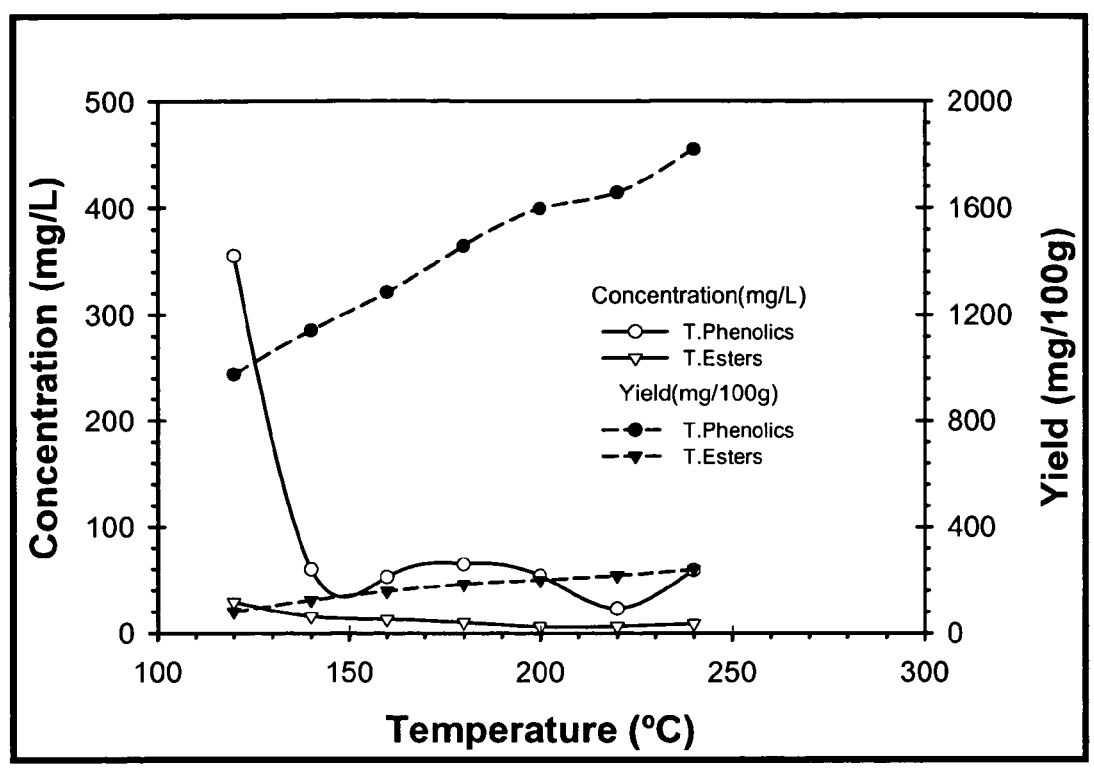
FIG. 23 shows total phenolics and tartaric esters extracted from parsley with subcritical water under an incremental temperature gradient that ranged from 120° to 240° C.
Figure 24:
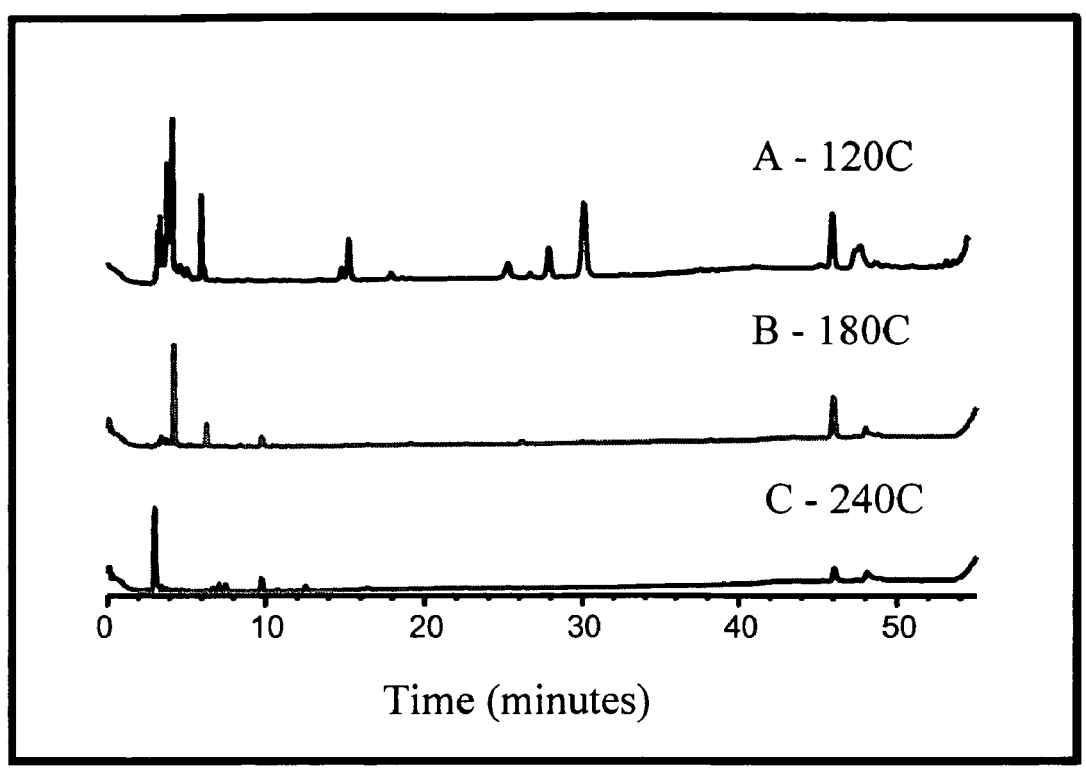
FIG. 24 shows HPLC chromatograms of three parsley eluent fractions extracted with subcritical water.

A sequential-temperature extraction of fresh, whole parsley shoots and leaves with subcritical water was performed under an incremental temperature gradient that ranged from 120° C. to 240° C. The system was configured and operated as illustrated in FIG. 1 and described in Example 3. The flow rate of subcritical water through the extraction vessel was 1 mL/min for the duration of the extraction process. The temperature gradient increased in 20° C.-increments with 15 min residence at each temperature step. Eluent fractions were sequentially collected at 15-min intervals throughout the duration of the extraction process. The patterns of extraction of total phenolics from parsley with regard to total concentrations and yields (FIG. 23) were similar to those for blackcurrant berries (FIG. 21). However, subcritical water extraction of parsley yielded tartaric esters primarily apigenin and luteolin glycosides, and cinnamic acid derivatives (FIGS. 23 and 24).

EXAMPLE 6

The dark pigmentation of sweet cherries is due to the high concentration of anthocyanin phytochemicals in their skins. Numerous cultivars also have significant levels of anthocyanins in their pulp tissues. It is known that the major anthocyanin phytochemicals in sweet cherries are 3-rutinoside and 3-glucoside of cyanidin while the minor anthocyanins include 3-rutinoside and 3-glucoside of peonidin, and pelargonidin 3-rutinoside. Sweet cherry fruits also contain significant amounts of non-pigmented, i.e., colourless phenolic compounds such as neochlorogenic acid and p-coumaroylquinic acid.

Figure 25:
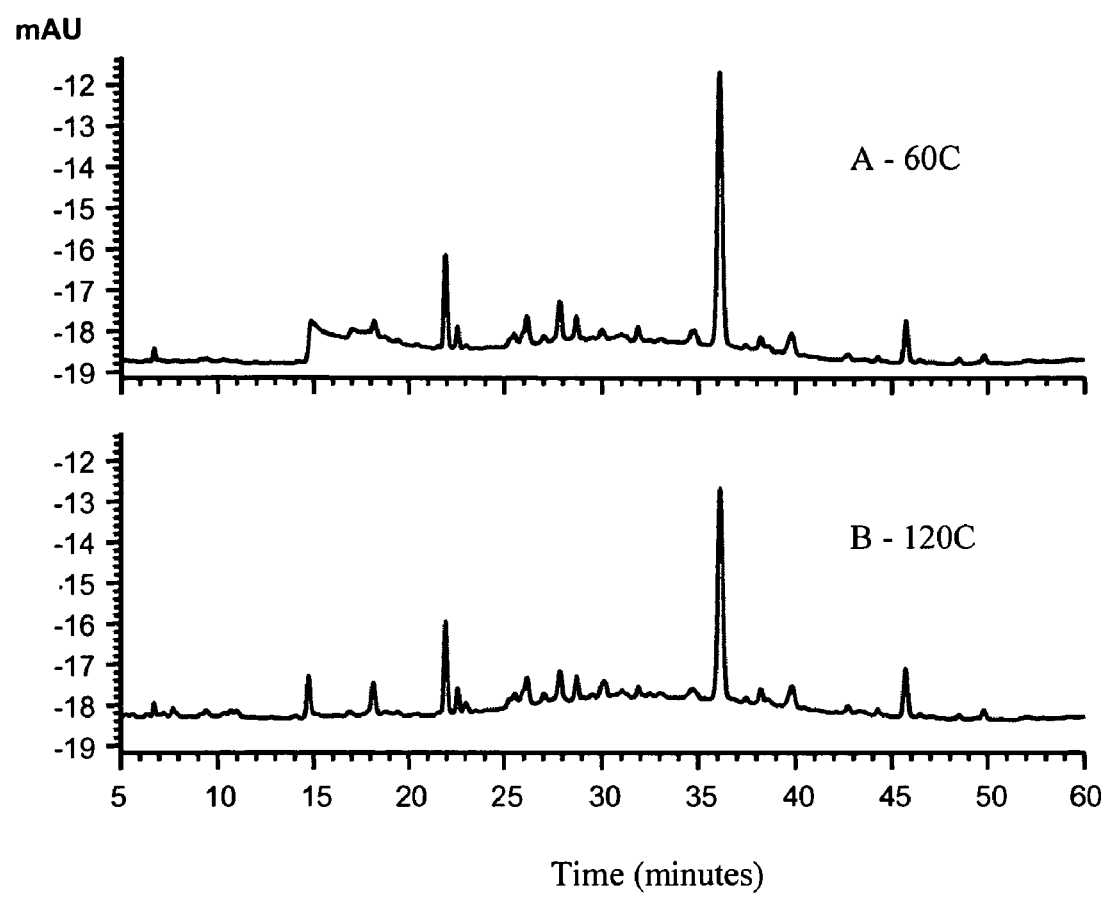
FIG. 25 shows HPLC chromatograms of total phenolic compounds present in eluent fractions extracted from sweet cherry fruit.
Figure 26:
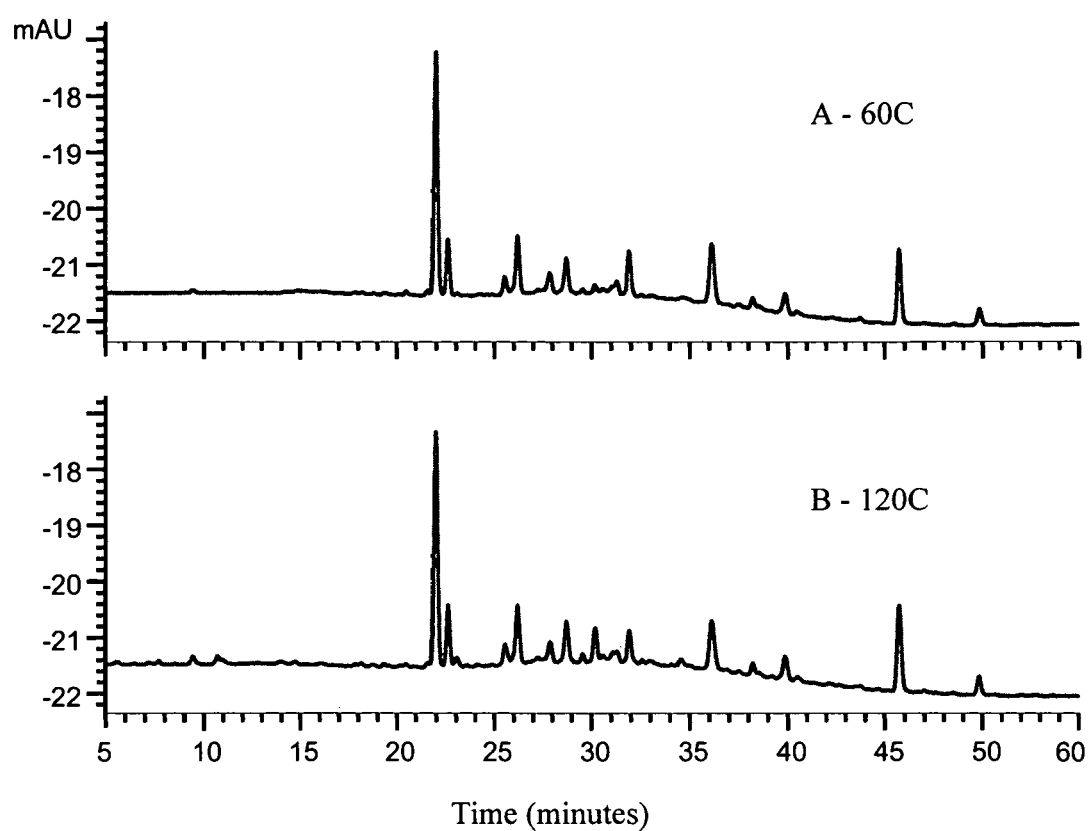
FIG. 26 shows HPLC chromatograms of flavanol compounds present in eluent fractions extracted from sweet cherry fruit.
Figure 27:
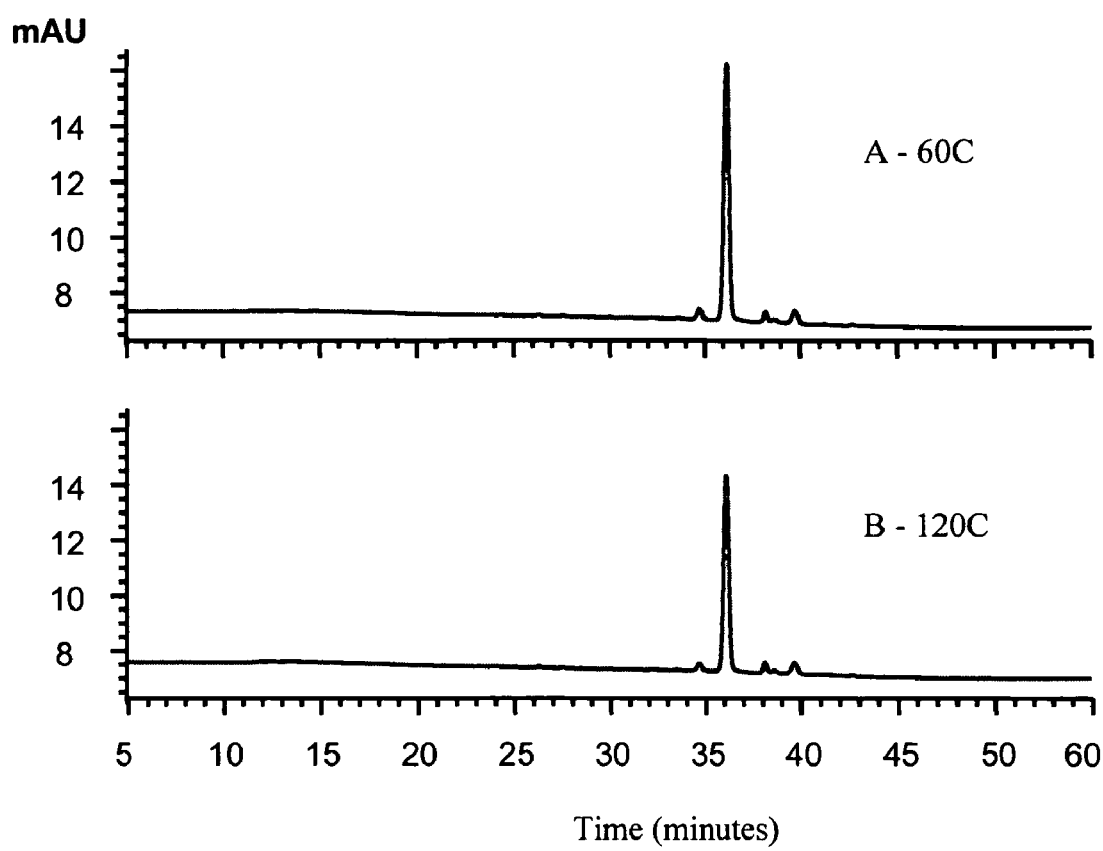
FIG. 27 shows HPLC chromatograms of anthocyanins present in eluent fractions extracted from sweet cherry fruit.

Isothermal temperature extractions of fresh, pitted sweet cherries were performed with subcritical water maintained at either 60° C. or 120° C. The system was configured and operated as illustrated in FIG. 1 and described in Example 3. The volume of subcritical water passed through the extraction vessel during each extraction process was 30 mL/g plant material over a 2-h period. The extracts were analyzed by HPLC at 280 nm for total phenolics, 320 nm for flavonols, and 525 nm for anthocyanins. The data demonstrate that the extraction efficiency of subcritical water maintained at 60° C. is comparable to subcritical water maintained at 120° C. for total phenolics (FIG. 25) and flavonols (FIG. 26), while greater quantities of anthocyanins were extracted with 60° C. subcritical water compared to 120° C. subcritical water (FIG. 27).

EXAMPLE 7

Figure 28:
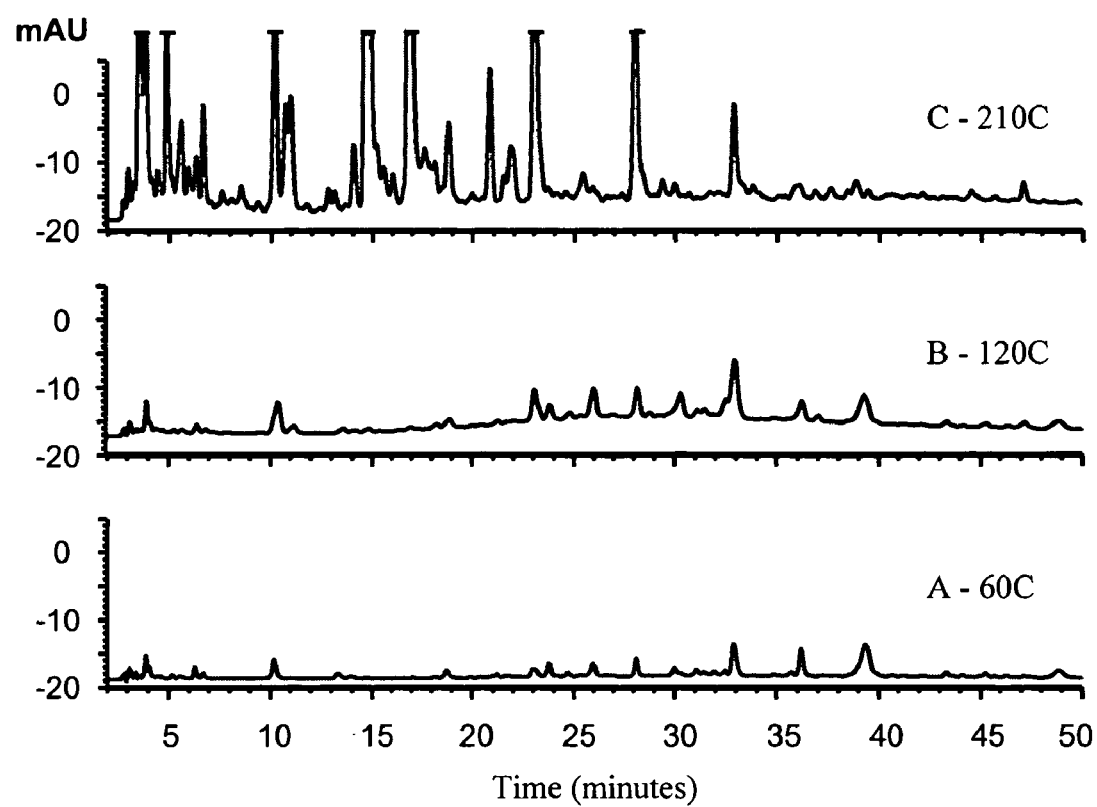
FIG. 28 shows HPLC chromatograms of total phenolics present in eluent fractions extracted from grape skins.

Isothermal temperature extractions of fresh red grape skins were performed with subcritical water maintained at 60° C., 120° C. or 240° C. The system was configured and operated as illustrated in FIG. 1 and described in Example 3. The volume of subcritical water passed through the extraction vessel during each extraction process was 60 mL/g plant material over a 2-h period. The data in FIG. 28 show that although the highest temperature subcritical water used for extraction, i.e., 240° C., yielded the highest quantities of individual phenolics, different types of phenolic compounds were extracted at 240° C. compared to those extracted at each of the two lower temperatures, i.e., 60° C. and 120° C., assessed in this example (FIG. 28).

While this invention has been described with respect to the preferred embodiments, it is to be understood that various alterations and modifications can be made to the methods and to the configuration of the systems disclosed herein for extraction of phytochemicals from plant materials with temperature-controllable subcritical water within the scope of this invention, which are limited only by the scope of the appended claims.

What is claimed is:

1. A method for sequentially extracting, separating, and recovering phytochemicals from plant materials, comprising:
   (a) placing a plant material into a temperature-controllable extraction vessel having an inlet and an outlet;
   (b) providing a flow of subcritical water through the extraction vessel thereby producing an eluant from the plant material;
   (c) from a starting temperature selected from the range of about 55° C. to about 99° C. to an ending temperature selected from the range of about 100° C. to about 373° C., providing a sequence of increasing temperatures applied to the flow of subcritical water therein the extraction vessel, thereby producing a sequence of sub-volumes of subcritical water, each sub-volume corresponding to a discrete temperature from the sequence of increasing temperatures; and
   (d) sequentially collecting a sequence of discrete eluant fractions flowing from the outlet, each discrete eluant fraction corresponding to a sub-volume of subcritical water, wherein one of said discrete eluant fractions comprises at least a first phytochemical extracted from the plant material of step (a) and another of said discrete eluant fractions comprises at least a second phytochemical extracted from the plant material of step (a).

2. The method according to claim 1 wherein the flow of a sub-volume of subcritical water occurs during a period of temperature change between a first temperature and a second temperature of the temperature sequence, the sub-volume producing a corresponding discrete eluant fraction.

3. The method according to claim 1 wherein the ending temperature is selected from the range of 100° C. to 251° C.

4. The method according to claim 1 wherein the sequence of sub-volumes of subcritical water has an adjusted pH selected from a group consisting of acidic pHs and basic pHs.

5. The method according to claim 1 wherein a sequence of increasing pHs with a starting pH from a range of about 3.5 to about 7.0 and an ending pH selected from the range of about 7.1 to about 9.5, is applied to the flow of subcritical water therein the extraction vessel thereby producing a sequence of sub-volumes of subcritical water, each sub-volume corresponding to a discrete pH from the sequence of increasing pHs.

6. The method according to claim 1 wherein each of said discrete eluant fractions is further individually processed with a process selected from a group consisting of purification, concentration, fractionation, and drying.

7. The method according to claim 1 wherein each of said discrete eluant fractions is further individually processed with a combination of processes selected from a group consisting of purification, concentration, fractionation, and drying.

8. The method according to claim 1 wherein a sequence of decreasing pHs with a starting pH from a range of about 9.5 to about 7.0 and an ending pH selected from the range of about 6.9 to about 3.5, is applied to the flow of subcritical water therein the extraction vessel thereby producing a sequence of sub-volumes of subcritical water, each sub-volume corresponding to a discrete pH from the sequence of decreasing pHs.

* * * * *